United States Patent
Mi et al.

(10) Patent No.: US 9,789,777 B2
(45) Date of Patent: Oct. 17, 2017

(54) DOUBLE-SIDED LCC COMPENSATION METHOD FOR WIRELESS POWER TRANSFER

(71) Applicant: The Regents of The University of Michigan, Ann Arbor, MI (US)

(72) Inventors: Chris Mi, Detroit, MI (US); Junjun Deng, Dearborn, MI (US); Trong-Duy Nguyen, Dearborn, MI (US); Weihan Li, Westland, MI (US); Siqi Li, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 498 days.

(21) Appl. No.: 14/328,077

(22) Filed: Jul. 10, 2014

(65) Prior Publication Data
US 2015/0015197 A1 Jan. 15, 2015

Related U.S. Application Data

(60) Provisional application No. 61/844,987, filed on Jul. 11, 2013.

(51) Int. Cl.
*H02J 7/00* (2006.01)
*B60L 11/18* (2006.01)
(Continued)

(52) U.S. Cl.
CPC ........... *B60L 11/182* (2013.01); *B60L 3/0023* (2013.01); *B60L 11/14* (2013.01); *B60L 11/1812* (2013.01);
(Continued)

(58) Field of Classification Search
CPC ...................................................... B60L 11/182
(Continued)

(56) References Cited

U.S. PATENT DOCUMENTS

2009/0189458 A1* 7/2009 Kawasaki ............. B60L 11/182
307/104
2010/0184371 A1 7/2010 Cook et al.
(Continued)

FOREIGN PATENT DOCUMENTS

WO WO-2011112795 A1 9/2011
WO WO-2012172410 A1 12/2012

OTHER PUBLICATIONS

"A Unity-Power-Factor IPT Pickup for High-Power Applications", N. A. Keeling et al, IEEE Transactions on Industrial Electronics, vol. 57, No. 2, Feb. 2010.
(Continued)

*Primary Examiner* — Richard Isla Rodas
*Assistant Examiner* — Johali Torres Ruiz
(74) *Attorney, Agent, or Firm* — Harness, Dickney & Pierce, P.L.C.

(57) ABSTRACT

A double-sided LCC compensation network and a tuning method are proposed for a wireless power transfer system. With the proposed topology, the resonant frequency is independent of coupling coefficient and load conditions. The parameter values are tuned to realize zero voltage switching (ZVS) for the sending side switches. A wireless charging system with up to 7.7 kW output power was designed and built using the proposed topology and achieved 96% efficiency from DC power source to battery load.

15 Claims, 22 Drawing Sheets

(51) Int. Cl.
*H04B 5/00* (2006.01)
*H02J 7/02* (2016.01)
*B60L 3/00* (2006.01)
*B60L 11/14* (2006.01)
*H02J 5/00* (2016.01)
*H02J 50/70* (2016.01)

(52) U.S. Cl.
CPC ........... *B60L 11/1833* (2013.01); *H02J 5/005* (2013.01); *H02J 7/025* (2013.01); *H02J 50/70* (2016.02); *H04B 5/0037* (2013.01); *H04B 5/0081* (2013.01); *B60L 2210/30* (2013.01); *B60L 2210/40* (2013.01); *B60L 2240/527* (2013.01); *B60L 2240/529* (2013.01); *B60L 2270/147* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
USPC .......................................................... 320/108
See application file for complete search history.

(56) References Cited

U.S. PATENT DOCUMENTS

| 2011/0193416 | A1 | 8/2011 | Campanella et al. | |
|---|---|---|---|---|
| 2012/0153733 | A1* | 6/2012 | Schatz | B60L 3/0069 307/104 |
| 2012/0217926 | A1 | 8/2012 | Yoon et al. | |
| 2012/0293020 | A1 | 11/2012 | Lee | |
| 2013/0188397 | A1* | 7/2013 | Wu | H02M 3/33576 363/17 |
| 2013/0242617 | A1* | 9/2013 | Zhang | H02M 3/33569 363/17 |

OTHER PUBLICATIONS

"ZCS LCC-Compensated Resonant Inverter for Inductive-Power-Transfer Application", Z. Pantic, et al., IEEE Transactions on Industrial Electronics, vol. 58, No. 8, Aug. 2011.

* cited by examiner

DOUBLE-SIDED LCC COMPENSATION METHOD FOR WIRELESS POWER TRANSFER

CROSS-REFERENCE TO RELATED APPLICATIONS

This application claims the benefit of U.S. Provisional Application No. 61/844,987 filed on Jul. 11, 2013. The entire disclosure of the above application is incorporated herein by reference.

FIELD

The present disclosure relates to a double-sided LCC compensation network and its tuning method for wireless power transfer.

BACKGROUND

The wireless power transfer (WPT) using magnetic resonant concept was proposed by Nikola Tesla more than 100 years ago. Until recently, with the development of power electronics technology, it is realized that a wireless power transfer system can be implemented economically enough to have a commercial value. Several companies have already developed products which can transfer power with acceptable power level and efficiency through a certain air gap.

In a wireless power transfer system, the energy is transferred through the mutual inductance of the transmit coil and receive coil, while the leakage inductance does not have a direct contribution to the active power transfer. Because of the large gap between the transmit coil and receive coil, the coupling coefficient between the two coils is small, typically in the range of 5% to 30% depending on the distance, alignment, and size of the coils. This causes the wireless power transfer systems to have a large leakage inductance but a small mutual inductance. To increase the coupling, the coil design, without a doubt, is important. Meanwhile, the compensation circuit which is used to cancel the leakage inductance, is also of great importance. Usually, capacitors, which can be lumped or parasitic, are added to form a resonant circuit, which is known as the magnetic resonant method.

Different compensation topologies have been proposed and implemented to tune the two coils working at a resonant frequency in a wide range of applications. There are four basic topologies depending on how the compensation capacitors are added to the transmit and receive coils, namely, series-series (SS), series-parallel (SP), parallel-series (PS), and parallel-parallel (PP) topologies. Some other novel topologies have also been proposed in the literature. For example, a dual-topology is realized by switching between a parallel compensated and a series compensated secondary side to realize both constant current mode and constant voltage mode. Moreover, the transmit and receive coils need to be connected to the power electronics converters. To achieve high efficiency for the complete wireless power transfer system, some additional topologies have been proposed. In another example, a LCL converter is formed by adding LC compensation network between the converter and the transmit coil. There are two advantages for the LCL converter when the system works at the resonant frequency. First, the inverter only supplies the active power required by the load; second, the current in the primary side coil is independent of the load condition. In yet another example, a LC compensation network at both primary and secondary sides is proposed for bidirectional power transfer. The design of a LCL converter usually requires the same value for the two inductors.

One of the uniqueness of wireless power transfer systems is the high spatial freedom of the coils. This means the air gap variation and misalignment of the transmit and receive coils are inevitable. Usually, the system parameters and resonant frequency of the primary and secondary resonant tanks change when the coupling condition changes. With traditional compensation topologies, in order to achieve high efficiency, a tuning method is needed to maintain the resonance when the air gap changes or misalignment happens. There are two main methods, namely frequency control and impedance matching. Phase-locked loop techniques are able to tune the operating frequency to track the resonant frequency which will change due to the variation of gap length, misalignment and tolerance variation of the tuning components. Alternatively, impedance matching can be applied. Either method is difficult to implement in practice due to the uncertainty of the variations of the system. The overall system efficiency has also been constrained.

In this disclosure, a double-sided LCC compensation topology and its parameter design method is proposed. The topology consists of one inductor and two capacitors at both the primary and secondary sides. With the proposed method, the resonant frequency of the compensated coils is independent of the coupling coefficient and the load condition. The wireless power transfer system can work at a constant frequency, which eases the control and narrows the occupation of frequency bandwidth. Nearly unit power factors can be achieved for both the primary side and the secondary side converters in the whole range of coupling and load conditions, thus high efficiency for the overall system is easily achieved. A parameter tuning method is also proposed and analyzed to achieve ZVS operation for the MOSFET-based inverter. The proposed method is more attractive in an environment where the coupling coefficient keeps changing, like the electric vehicle charging application. Also, due to its symmetrical structure, the proposed method can be used in a bi-directional WPT system. Simulation and experimental results verified analysis and validity of the proposed compensation network and the tuning method. A prototype with 7.7 kW output power for electric vehicles was built, and 96% efficiency from DC power source to battery load is achieved.

This section provides background information related to the present disclosure which is not necessarily prior art.

SUMMARY

This section provides a general summary of the disclosure, and is not a comprehensive disclosure of its full scope or all of its features.

A double-sided LCC compensation network is provided for a wireless power transfer system. The wireless power transfer system is comprised generally of a send unit configured to transfer power using inductive power transfer and a receive unit configured to receive the power from the send unit. The send unit includes an inverter configured to receive a DC input signal and convert the DC input signal to an AC output signal at a desired resonant frequency; a send coil configured to receive the AC output signal from the inverter and generate an alternating electromagnetic field; and a send side compensation circuit interconnecting the inverter with the send coil. More specifically, the send side compensation circuit is comprised of a send side inductor and a send side series capacitor serially coupled together and coupled to a positive terminal of the send coil, as well as a send side parallel capacitor coupled in parallel with the send coil.

The receive unit includes a receive coil configured to receive the alternating electromagnetic field from the send coil of the send unit and output an AC charging signal; a receive side converter configured to receive the AC charging signal from the receive coil and convert the AC charging signal to a DC charging signal; and a receive side compensation circuit interconnecting the receive coil with the receive side converter. Likewise, the receive side compensation circuit is comprised of a receive side inductor and a receive side series capacitor serially coupled together and coupled to a positive terminal of the receive coil, as well as a receive side parallel capacitor coupled in parallel with the receive coil.

In one embodiment, the inverter is further defined as a full bridge converter circuit comprised of four MOSFET switches. A controller is electrically coupled to the four switches and operates to turn the switches on and off at a zero voltage switching condition.

The turn off current delivered by the controller can be computed in accordance with $$I_{OFF} = \sqrt{2}\left(\frac{\frac{U_{ab}^2}{U_{AB}}\left(\frac{\Delta L_{e2}}{L_{f2}} - \frac{1}{4}\right)}{\omega_0 L_{f2}} + \frac{U_{AB}}{4\omega_0 L_{f1}}\right)$$

where $U_{AB}$ is first order root mean square value of input voltage to the inverter, $U_{ab}$ is first order root mean square value of output voltage of receive side converter, $L_{f1}$ is inductance of send side inductor, $L_{f2}$ is inductance of receive side inductor, $\omega_0$ is resonant frequency and $\Delta L_{e2}$ is an increase in value of $L_{f2}$ to ensure the turn off current is positive.

In some embodiments, the circuit parameters are tuned such that $\Delta L_{e2}$ is computed in accordance with $$\Delta L_{e2} = \frac{1}{4}L_{f2} + \frac{I_{OFF\_min}^2 \cdot \omega_0^2 \cdot L_{f1} \cdot L_{f2}^2}{U_{ab\_min}^2}$$

where $U_{ab\_min}$ is the minimum first order root mean square value of output voltage of receive side converter and $I_{OFF\_min}$ is minimum turn off current to achieve $U_{ab\_min}$.

In other embodiments, the receive side converter is further defined as a full wave rectifier circuit. A battery may be configured to receive the DC charging signal from the receive side converter and the receive unit is integrated into a vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
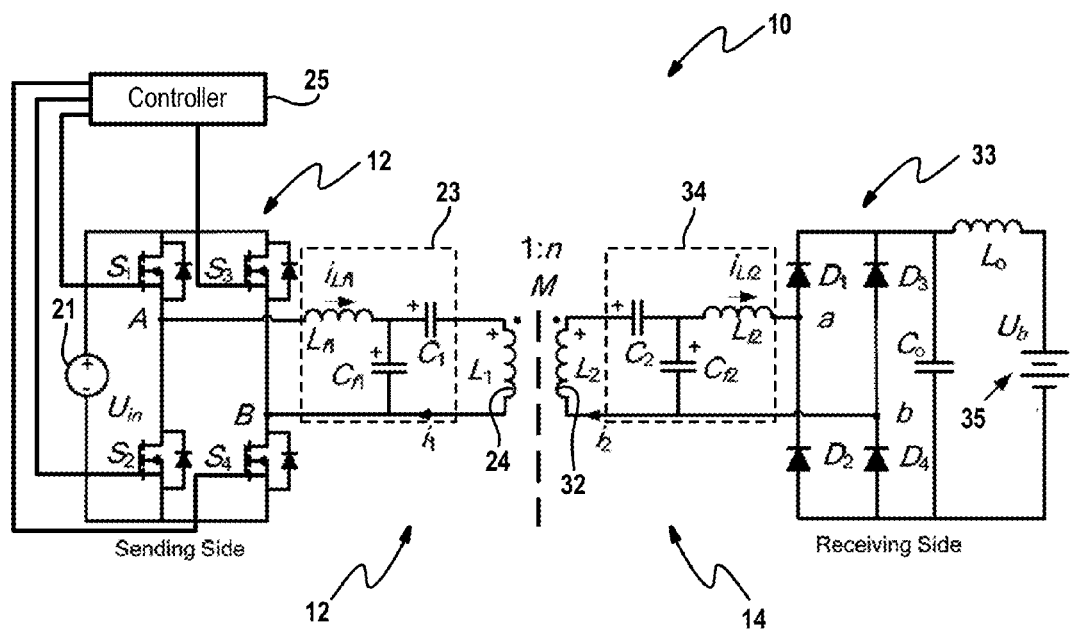
FIG. 1 is a schematic of a double-sided LCC compensation topology for wireless power transfer.

FIG. 1 depicts an example embodiment of a double-sided LCC compensation network and corresponding power electronics circuit components in the context of a wireless power transfer system 10. The wireless power transfer system 10 is comprised generally of a send unit 12 and a receive unit 14. The send unit 12 is configured to transfer power using inductive power transfer; whereas, the receive unit 14 is configured to receive power via inductive power transfer from the send unit. In one embodiment, the send unit 12 is implemented as a pad for placement in a garage and the receive unit 14 is attached to the underside on an electric or hybrid electric vehicle. Other applications for the power transmission system 10 also fall within the scope of this disclosure.

The send unit 12 includes a DC power source 21, an inverter 22, a send side compensation circuit 23 and a send coil 24. The inverter 22 receives a DC input signal from the power source 21 and converts the DC input signal to an AC output signal at a desired resonant frequency. In one embodiment, the inverter 22 is a full bridge converter circuit comprised of four power MOSFETs $S_1 \sim S_4$ although other circuit arrangements for the inverter are contemplated by this disclosure. A controller 25 interfaced with each of the MOSFETs controls the switching operation of the inverter 22. The controller 25 turns the switches on and off to generate the AC output signal at the desired resonant frequency. In some embodiments, a rectifier (not shown) may be connected between an AC power source and the inverter 22.

The send side compensation circuit 23 interconnects the inverter 22 with the send coil 24. In the example embodiment, the compensation circuit is comprised of a send side inductor $L_{f1}$, a send side series capacitor $C_1$ and a send side parallel capacitor $C_{f1}$. The send side inductor and the send side series capacitor are serially coupled together and coupled to a positive terminal of the send coil; whereas, the send side parallel capacitor is coupled in parallel with the send coil.

The receive unit 14 includes a receive coil 32, a receive side converter 33 and a receive side compensation circuit 34. The receive side converter 33 receives an AC charging signal from the receive coil 32 and converts the AC charging signal to a DC charging signal. In one embodiment, the converter is a bridge rectifier circuit comprised of four diodes $D_1 \sim D_4$ although other circuit arrangements for the converter are contemplated by this disclosure. In some embodiments, a battery is configured to receive the DC charging signal from the converter 33. M is the mutual inductance between the send coil and the receive coil.

The receive side compensation circuit 34 interconnects the receive coil 32 with the converter 33. In the example embodiment, the compensation circuit is comprised of a receive side inductor $L_{f2}$, a receive side series capacitor C2 and a receive side parallel capacitor $C_{f2}$. The receive side inductor and the receive side series capacitor are serially coupled together and coupled to a positive terminal of the send coil; whereas, the receive side parallel capacitor is coupled in parallel with the send coil. It is to be understood that the relevant components of the send unit and the receive unit are discussed in relation to FIG. 1, but that other components may be needed to implement the wireless power transfer system.

Figure 2:
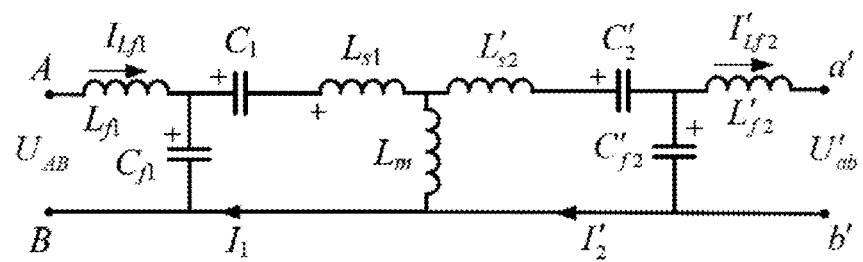
FIG. 2 is a schematic of an equivalent circuit of the topology shown in FIG. 1.

For a first step, a concise characteristic of the proposed compensation network will be given by analyzing the first order harmonics of the square voltage waveform at the switching frequency. The resistance on all the inductors and capacitors are neglected for simplicity of analysis. The accuracy of the approximations will be verified by circuit simulation and experiments in the latter sections. The equivalent circuit of the circuit in FIG. 1 referred to the primary side is derived as shown in FIG. 2. The apostrophe symbols indicate the variables of the secondary side referred to the primary side. The turns-ratio of the secondary to primary side is defined as $$n = \sqrt{L_2/L_1}, \quad (1)$$

where $L_1$ is self-inductance of the send coil and $L_2$ is self-inductance of the receive coil. The variables in FIG. 2 can be expressed by the following equations:

$$L_m = k \cdot L_1,$$

$$L_{s1} = (1-k) \cdot L_1,$$

$$L'_{s2} = (1-k) \cdot L_2/n^2,$$

$$L'_{f2} = L_{f2}/n^2,$$

$$C'_2 = n^2 \cdot C_2,$$

$$C'_{f2} = n^2 \cdot C_{f2},$$

$$U'_{ab} = U_{ab}/n. \quad (2)$$

where $U_{AB}$ is the first order root mean square of the input voltage and $U_{ab}$ is the first order root mean square of the output voltage from the converter 33. For a high order system in FIG. 1, there are multiple resonant frequencies. This disclosure does not focus on the overall frequency domain characteristics.

Rather, only one frequency point, which could be tuned to a constant resonant frequency, is studied. Here, the resonant means the input voltage $U_{AB}$ and current $I_{Lf1}$ of the compensated coil system are in phase. The circuit parameters are designed by the following equations to achieve a constant resonant frequency for the topology.

$$L_{f1} \cdot C_{f1} = \frac{1}{\omega_0^2}, \quad (3)$$

$$L_{f2} \cdot C_{f2} = \frac{1}{\omega_0^2},$$

$$L_1 - L_{f1} = \frac{1}{\omega_0^2 C_1},$$

$$L_2 - L_{f2} = \frac{1}{\omega_0^2 C_2},$$

where $\omega_0$ is the angular constant resonant frequency, which is only relevant to inductors and capacitors in the system, independent of coupling coefficient k and load conditions.

Figure 3A:
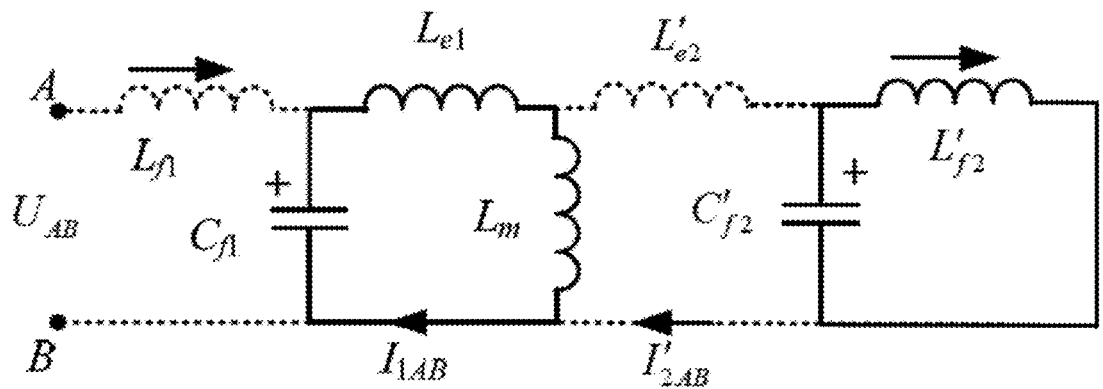
FIG. 3A is a schematic depicting circuit characteristics of the equivalent circuit at resonant frequency when only an input voltage is applied.
Figure 3B:
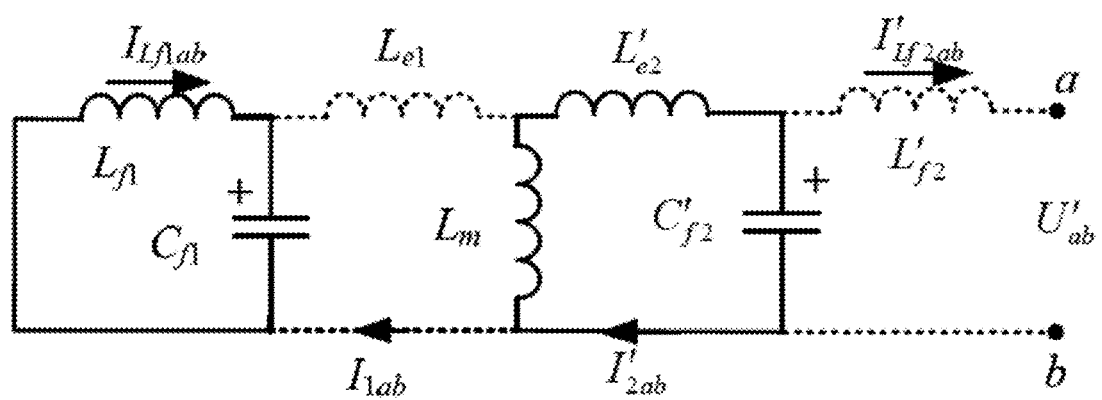
FIG. 3B is a schematic depicting circuit characteristics of the equivalent circuit at resonant frequency when only an input voltage divided by the turns-ratio is applied.

Under the above rules, the circuit characteristics will be analyzed at resonant frequency $\omega_0$. According to superposition theory, the effect of $U_{AB}$ and $U'_{ab}$ can be analyzed separately, as shown in FIGS. 3A and 3B. The dashed line means there is no current on that path. FIG. 3A is used to analyze the effect of $U_{AB}$. The additional subscript indicates that current is contributed by $U_{AB}$. To make the analysis clear, the series connected capacitor and inductor branches, $C_1$, $L_{s1}$ and $C'_2$, $L'_{s2}$ are expressed using an equivalent inductance $L_{e1}$ and $L'_{e2}$, where $$L_{e1} = \frac{1}{j\omega_0} \cdot \left( \frac{1}{j\omega_0 C_1} + j\omega_0 L_{s1} \right) = L_{f1} - k \cdot L_1, \quad (4)$$

$$L'_{e2} = \frac{1}{j\omega_0} \cdot \left( \frac{1}{j\omega_0 C'_2} + j\omega_0 L'_{s2} \right) = L'_{f2} - k \cdot L_1. \quad (5)$$

$L'_{f2}$ and $C'_{f2}$ form a parallel resonant circuit, which can be regarded as an open circuit at the resonant frequency $\omega_0$. Thus, $I'_{2AB}=0$. In the left part of the circuit, $L_{e1}$, $L_m$ are connected in series, and $$L_{e1} + L_m = L_{f1} - k \cdot L_1 + k \cdot L_1 = L_{f1} \quad (6)$$

It forms another parallel resonant circuit with $C_{f1}$ at the same resonant frequency $\omega_0$. Thus, $I_{Lf1AB}=0$. Because there is no current through $L_{f1}$ and $L'_{e2}$, the voltage on $C_{f1}$ equals $U_{AB}$, and the voltage on $C_{f2}$ equals the voltage on $L_m$. $I_{1AB}$ and $I'_{Lf2AB}$ can be easily solved:

$$i_{1AB} = \frac{\dot{U}_{AB}}{j\omega_0 L_{f1}} \quad (7)$$

$$i'_{Lf2AB} = \frac{k\dot{U}_{AB} L_1}{j\omega_0 L_{f1} L'_{f2}} \quad (8)$$

When $U'_{ab}$ is applied, the analysis is similar to that when $U_{AB}$ is applied. An additional subscript $_{ab}$ is added to indicate that the current is contributed by $U_{ab}$. The solutions are $i'_{Lf2ab}=0$, $i_{1ab}=0$ and $$i'_{2ab} = -\frac{\dot{U}'_{ab}}{j\omega_0 L'_{f2}} \quad (9)$$

$$i_{Lf1ab} = -\frac{k\dot{U}'_{ab} L_1}{j\omega_0 L_{f1} L'_{f2}} \quad (10)$$

$\dot{U}'_{ab}$ is a passive voltage generated according to the conduction mode of diodes $D_1 \sim D_4$. It should be in phase with $i'_{Lf2}$. Since $i'_{Lf2ab}=0$, $\dot{U}'_{ab}$ is in phase with $I'_{Lf2AB}$. If $\dot{U}_{AB}$ as the reference, $\dot{U}_{AB}$ and $\dot{U}'_{ab}$ can be expressed as $$\dot{U}_{AB} = U_{AB} \quad (11)$$

$$\dot{U}'_{ab} = \frac{U'_{ab}}{j} = -j \cdot U'_{ab} \quad (12)$$

On the other hand, $$\dot{U}'_{ab} = U'_{ab} (\cos \phi + j \sin \phi) \quad (13)$$

where $\phi = -\pi/2$ is the phase by which $\dot{U}_{ab}$ leads $\dot{U}_{AB}$.

Substitute (2), (11), (12) into (7)-(10), and sum up the current generated by $U_{AB}$ and $U'_{ab}$ to get $$i_{Lf1} = i_{Lf1ab} = \frac{kL_1 U'_{ab}}{\omega_0 L_{f1} L'_{f2}} = \frac{k\sqrt{L_1 L_2} \, U_{ab}}{\omega_0 L_{f1} L_{f2}} \quad (14)$$

$$i_1 = i_{1AB} = \frac{U_{AB}}{j\omega_0 L_{f1}} \quad (15)$$

$$i_2 = \frac{i'_2}{n} = \frac{i'_{2ab}}{n} = \frac{U'_{ab}}{n \cdot \omega_0 L'_{f2}} = \frac{U_{ab}}{\omega_0 L_{f2}} \quad (16)$$

$$i_{Lf2} = \frac{i'_{Lf2}}{n} = \frac{i'_{Lf2AB}}{n} = \frac{k\sqrt{L_1 L_2} \cdot U_{AB}}{j \cdot \omega_0 L_{f1} L_{f2}} \quad (17)$$

From (11), (12) and (14), it can be seen that the input voltage and current are in phase. Unit power factor for the converter is achieved. Consequently, the transferred power can be calculated by $$P = \dot{U}_{AB} \cdot i_{LF1} = \frac{\sqrt{L_1 L_2}}{\omega_0 L_{f1} L_{f2}} \cdot k U_{AB} U_{ab} \quad (18)$$

It can be seen that the output power is proportional to the coupling coefficient k, the input voltage $U_{AB}$, and the output voltage $U_{AB}$. Thus, power can be easily controlled by changing the input voltage or output voltage. It is also noted that a buck or boost converter can be inserted either before the sending side inverter or after the receiving side rectifier to control the output power.

If the coils and compensation network parameters are designed exactly according to the above rules, all the MOSFETs will be turned on and off at a zero current switching (ZCS) condition. However, ZCS is not a perfect soft switching condition in converters containing MOSFETs and diodes. To minimize the switching loss, it is better that all switches are turned on and off at a zero voltage switching (ZVS) condition. The parasitic output capacitance of the MOSFET holds the voltage close to zero during the turn-off transition. So the turn-off switching loss is very small. However, in the turn-on transition, ZVS operation is required to prevent both body diode reverse recovery and parasitic output capacitance from inducing switching loss. To realize ZVS for a MOSFET, the body diode should conduct before the MOSFET does. It is essential that the MOSFET needs to be turned on at a negative current. For a full-bridge converter, this means the input impedance of the resonant network should be inductive. In this case, the resonant current lags the resonant voltage which forms the ZVS operation condition for all MOSFETs.

In this disclosure, the ZVS operation condition refers to ensuring the turn-off current to be positive to realize ZVS turn-on of another MOSFET in the same arm. There can be several ways to tune the system parameters to ensure the MOSFETs turn off at a positive current. Here, one example way is introduced and analyzed.

Figure 4:
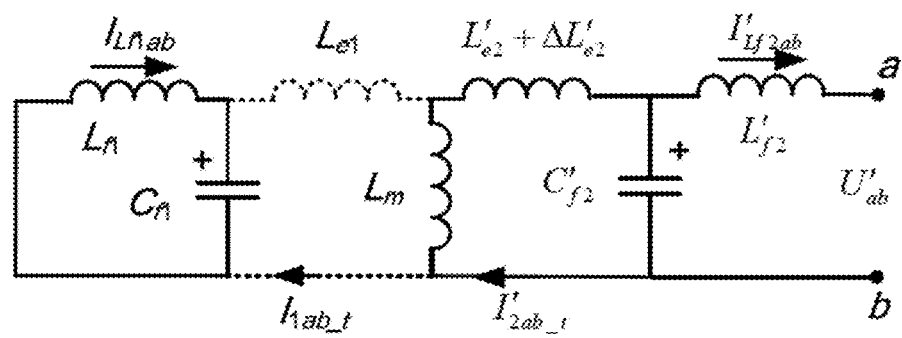
FIG. 4 is a schematic of an equivalent circuit having system parameters tuned to ensure that MOSFETs turn off at a positive current.

To achieve ZVS, the value of $L_{e2}$ is increased slightly. As shown in FIG. 4, the change of $L_{e2}$ is $\Delta L'_{e2}$. Also, superposition method is used to analyze the tuned circuit. When $U_{AB}$ is applied to the circuit, the equivalent circuit is the same as in FIG. 3A. $I_{Lf1AB}$ is zero. While, when $U'_{ab}$ is applied, $i'_{Lf2ab}$ is not zero any more. The circuit is again solved with the variation of $\Delta L'_{e2}$, and the following equations can be derived.

$$i'_{Lf2ab\_1st} = -j \cdot \frac{\dot{U}'_{ab}}{\omega_0 \cdot L'_{f2}} \cdot \frac{\Delta L'_{e2}}{L'_{f2}}, \quad (19)$$

$$\begin{aligned}
i'_{Lf2\_1st} &= i'_{Lf2AB} + i'_{Lf2ab\_1st} \\
&= \frac{kU_{AB} L_1}{j\omega_0 L_{f1} L'_{f2}} - j \cdot \frac{U'_{ab} \cdot (\cos\varphi + j \sin\varphi)}{\omega_0 \cdot L'_{f2}} \cdot \frac{\Delta L'_{e2}}{L'_{f2}} \\
&= \frac{U'_{ab} \cdot \sin\varphi \cdot \Delta L'_{e2}}{\omega_0 (L'_{f2})^2} - j \cdot \left( \frac{U'_{ab} \cdot \cos\varphi \cdot \Delta L'_{e2}}{\omega_0 (L'_{f2})^2} + \frac{kU_{AB} L_1}{\omega_0 L_{f1} L'_{f2}} \right).
\end{aligned} \quad (20)$$

$$i'_{Lf2\_1st} = \frac{i'_{Lf2\_1st}}{n} \qquad (21)$$

$$= \frac{U_{ab} \cdot \sin\varphi \cdot \Delta L_{e2}}{\omega_0 L_{f2}^2} - j \cdot \frac{kU_{AB}\sqrt{L_1 L_2}}{\omega_0 L_{f1} L_{f2}} - j \cdot \frac{U_{ab} \cdot \cos\varphi \cdot \Delta L_{e2}}{\omega_0 L_{f2}^2},$$

where the subscript $1^{st}$ means the first harmonic component.

The phase of $\dot{U}'_{ab}$ is different from the phase of $i_{Lf2\_1st}$. From (12), (13) and (20), $$\varphi \text{ is } -\frac{\pi}{2}$$

when $\Delta L_{e2}$ is zero. When $L_{e2}$ is increased to realize ZVS, the change of $L_{e2}$ is relative small so $\phi$ is still close to $-\pi/2$ and $\sin\phi \approx -1$, $\cos\phi \approx 0$, $\Delta L_{e2} \ll L_{f2} < L_{f2}$. Usually, the additional inductors, $L_{f1}$ and $L_{f2}$, used as a reactive power compensator, are designed such that they are much smaller than the main coils. The following approximation can be obtained from (21):

$$\cos\varphi_1 \approx -\cot\varphi_1 \approx -\frac{U_{ab}}{U_{AB}} \cdot \frac{\Delta L_{e2} \cdot L_{f1}}{L_{f2} \cdot k\sqrt{L_1 L_2}} \qquad (22)$$

where $\phi_1$ ($-90° < \phi_1 \ll -180°$) is the phase by which $i_{Lf2\_1st}$ leads $\dot{U}_{AB}$.

To reduce the switching loss, it is preferred to achieve ZVS condition at a minimum turn-off current. This means at the switching point, the current is close to zero. The current slew rate at the switching point is high. A small phase error in the analysis will bring relatively large current error. If the phase error falls into the inductive region, it means a higher turn-off current and higher switching loss. If the phase error falls into the capacitive region, the turn-off current may be negative. It means ZVS is lost and severe reverse recovery in the MOSFET diode will occur. This will bring high switching loss and electromagnetic interference (EMI) problem. Therefore, the analysis accuracy of the turn-off current is very important. The high order harmonics of the square voltage should be considered. The inductor-capacitor network from the sending side to the receiving side is a high order filter. For the high order harmonics, the interaction between the sending and receiving side can be neglected. Thus, the high order current on $L_{f2}$ can be roughly calculated by:

$$\dot{i}_{Lf2\_3rd} \approx -\frac{\dot{U}_{ab\_3rd}}{j \cdot 3\omega_0 L_{f2} + \frac{1}{j \cdot 3\omega_0 C_{f2}}} = j\frac{3\dot{U}_{ab\_3rd}}{8\omega_0 L_{f2}} \qquad (23)$$

$$\dot{i}_{Lf2\_5th} \approx -\frac{\dot{U}_{ab\_5th}}{j \cdot 5\omega_0 L_{f2} + \frac{1}{j \cdot 5\omega_0 C_{f2}}} = j\frac{5\dot{U}_{ab\_5th}}{24\omega_0 L_{f2}}$$

...

$$\dot{i}_{Lf2\_(2k+1)th} \approx -\frac{\dot{U}_{ab\_(2k+1)th}}{j \cdot (2k+1)\omega_0 L_{f2} + \frac{1}{j \cdot (2k+1)\omega_0 C_{f2}}}$$

$$= j\frac{(2k+1)\dot{U}_{ab\_(2k+1)th}}{((2k+1)^2 - 1)\omega_0 L_{f2}}$$

...

According to (23), the phase difference between $U_{ab\_mth}$ and $i_{Lf2\_mth}$ is $\pi/2$. So when $\dot{U}_{ab}$ jumps at the time that $i_{Lf2}=0$, $i_{Lf2\_mth}$ reaches the peak. And the peak value can be calculated by $$\max\left\{\sum i_{Lf2\_mth}\right\} = \sqrt{2} \cdot \sum_{k=1}^{\infty} I_{LF2\_(2k+1)th} \qquad (24)$$

$$= \sqrt{2} \cdot \sum_{k=1}^{\infty} \frac{1}{((2k+1)^2 - 1)} \frac{U_{ab}}{\omega_0 L_{f2}}$$

$$= \frac{\sqrt{2}}{4} \cdot \frac{U_{ab}}{\omega_0 L_{f2}}$$

The phase by which $\dot{U}_{ab}$ leads $i_{Lf2\_1st}$ $\phi$, is close to 0 ($0 \leq \phi_2 \ll \pi/2$) and can be easily obtained by $$\sin\varphi_2 = \frac{\sqrt{2} \cdot \sum_{k=1}^{\infty} I_{Lf2\_(2k+1)th}}{\sqrt{2} \cdot I_{Lf2\_1st}} \approx \frac{1}{4} \cdot \frac{U_{ab}}{U_{AB}} \cdot \frac{L_{f1}}{k\sqrt{L_1 L_2}} \qquad (25)$$

Figure 5:
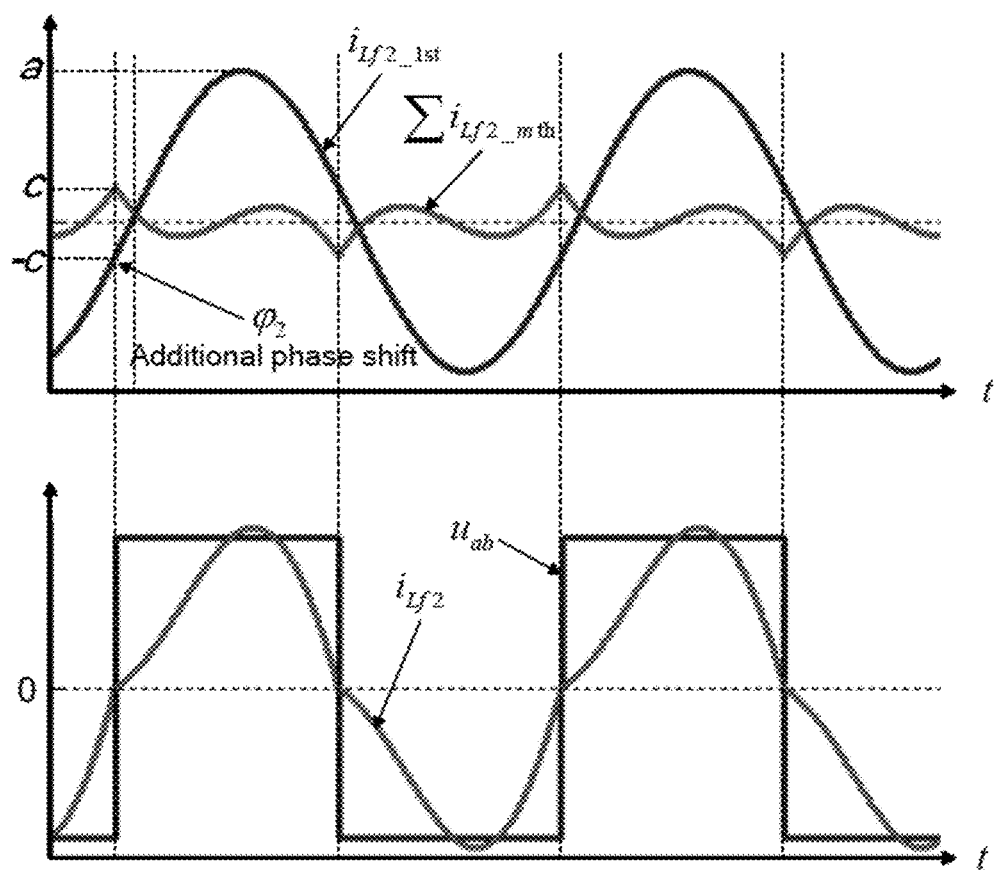
FIG. 5 is a graph illustrating the effect of all high order currents.

FIG. 5 shows the effect of the high order harmonic currents. The sign of $u_{ab}$ is determined by $i_{Lf2}$, which is a composition of both the first and high order harmonic currents. From (22) and (25), the following equation can be derived:

$$\cos\varphi = \cos(\varphi_1 + \varphi_2) \qquad (26)$$
$$= \cos\varphi_1 \cos\varphi_2 - \sin\varphi_1 \sin\varphi_2$$
$$\approx \cos\varphi_1 + \sin\varphi_2$$
$$\approx -\frac{U_{ab}}{U_{AB}} \cdot \frac{L_{f1}}{k\sqrt{L_1 L_2}} \cdot \left(\frac{\Delta L_{e2}}{L_{f2}} - \frac{1}{4}\right),$$

$$\dot{i}_{Lf1\_1st} = -\frac{k\dot{U}'_{ab} L_1}{j\omega_0 L_{f1} L'_{f2}} \qquad (27)$$

$$= -\frac{kU'_{ab}(\cos\varphi + j \cdot \sin\varphi) L_1}{j\omega_0 L_{f1} L'_{f2}}$$

$$= -\frac{kU'_{ab} \sin\varphi L_1}{\omega_0 L_{f1} L'_{f2}} - \frac{kU'_{ab} \cos\varphi L_1}{j \cdot \omega_0 L_{f1} L'_{f2}}$$

$$\approx \frac{kU'_{ab} L_1}{\omega_0 L_{f1} L'_{f2}} + \frac{\frac{U_{ab}^2}{U_{AB}}\left(\frac{\Delta L_{e2}}{L_{f2}} - \frac{1}{4}\right)}{j \cdot \omega_0 L_{f2}}$$

$$= \frac{kU_{ab}\sqrt{L_1 L_2}}{\omega_0 L_{f1} L_{f2}} + \frac{\frac{U_{ab}^2}{U_{AB}}\left(\frac{\Delta L_{e2}}{L_{f2}} - \frac{1}{4}\right)}{j \cdot \omega_0 L_{f2}}$$

From (27), an additional reactive current item is introduced. This current will increase the MOSFET turn-off current to achieve ZVS. For the sending side, similar to the analysis of the receiving side for the high order harmonics effect, the following equations can be obtained:

$$i_{Lf1\_3rd} \approx \frac{\dot{U}_{AB\_3th}}{j \cdot 3\omega_0 L_{f1} + \frac{1}{j \cdot 3\omega_0 C_{f1}}} = \frac{3\dot{U}_{AB\_3th}}{j \cdot 8\omega_0 L_{f1}} \quad (28)$$

$$i_{Lf1\_5rd} \approx \frac{\dot{U}_{AB\_5th}}{j \cdot 5\omega_0 L_{f1} + \frac{1}{j \cdot 5\omega_0 C_{f1}}} = \frac{5\dot{U}_{AB\_5th}}{j \cdot 24\omega_0 L_{f1}}$$

...

$$i_{LF1\_(2k+1)th} \approx -\frac{\dot{U}_{AB\_(2k+1)th}}{j \cdot (2k+1)\omega_0 L_{f1} + \frac{1}{j \cdot (2k+1)\omega_0 C_{f1}}}$$

$$= j\frac{(2k+1)U_{AB\_(2k+1)th}}{((2k+1)^2 - 1)\omega_0 L_{f1}}$$

...

$$\max\left\{\sum i_{Lf1\_mth}\right\} = \sqrt{2} \cdot \sum_{k=1}^{\infty} I_{Lf1\_(2k+1)th} \quad (29)$$

$$= \sqrt{2} \cdot \sum_{k=1}^{\infty} \frac{1}{((2k+1)^2 - 1)} \frac{U_{AB}}{\omega_0 L_{f1}}$$

$$= \frac{\sqrt{2}}{4} \cdot \frac{U_{AB}}{\omega_0 L_{f1}}$$

The MOSFET turn-off current is a composition of both the first order and the high order harmonic currents. From (27) and (29), the MOSFET turn-off current can be calculated as:

$$I_{OFF} = \sqrt{2}\left(\frac{\frac{U_{ab}^2}{U_{AB}}\left(\frac{\Delta L_{e2}}{L_{f2}} - \frac{1}{4}\right)}{\omega_0 L_{f2}} + \frac{U_{AB}}{4\omega_0 L_{f1}}\right) \quad (30)$$

According to the MOSFET parameters, a minimum turn-off current to achieve ZVS can be determined. Then a suitable $\Delta L_{e2}$ can be designed to ensure there is enough turn-off current to achieve ZVS for the whole operation range. To ensure $I_{OFF}$ is greater than a certain positive value, the following equation should be satisfied:

$$\frac{\Delta L_{e2}}{L_{f2}} \geq \frac{1}{4} \quad (31)$$

According to (30) and (31), the lower the output voltage is, the smaller the turn-off current is. The minimal turn-off current can be derived as:

$$I_{OFF\_min} = \frac{\sqrt{2} \cdot U_{ab\_min}}{\omega_0 \cdot L_{f2}} \sqrt{\frac{\Delta L_{e2}}{L_{f1}} - \frac{1}{4}\frac{L_{f2}}{L_{f1}}}, \quad (32)$$

where $U_{ab\_min}$ is the minimum RMS value of the output voltage. The minimum turn-off current is reached when $$U_{AB} = U_{ab\_min} \cdot \sqrt{4 \cdot \left(\frac{\Delta L_{e2}}{L_{f2}} - \frac{1}{4}\right) \cdot \frac{L_{f1}}{L_{f2}}} \quad (33)$$

Once the minimum MOSFET turn-off current is obtained, $\Delta L_{e2}$ can be calculated by $$\Delta L_{e2} = \frac{1}{4}L_{f2} + \frac{I_{OFF\_min}^2 \cdot \omega_0^2 \cdot L_{f1} \cdot L_{f2}^2}{U_{ab\_min}^2} \quad (34)$$

Next, an 8 kW wireless power transfer system is designed according to the above principle. Then, a comparison between the simulation results and the analytical results will be given in the next section to verify the effectiveness of the above analysis. The specifications of wireless battery charger are listed in Table I.

TABLE I

WIRELESS BATTERY CHARGER SPECIFICATIONS

| Spec/Parameter | Value |
| --- | --- |
| Input DC voltage | <425 V |
| Output battery voltage | 300 V~450 V |
| Nominal gap | 200 mm |
| Coupling coefficient[1] | 0.18~0.32 |
| Sending coil inductance[2] | 350~370 μH |
| Sending coil AC resistance | ~500 mΩ |
| Receiving coil inductance[2] | 350~370 μH |
| Receiving coil AC resistance | ~500 mΩ |
| Switching frequency | 79 kHz |
| Maximum power[3] | ~8 kW |
| Maximum efficiency[3] | ~97.1% |

The coupling coefficient varies because of misalignment. Its value is related to the coil design, which is not the focus of this disclosure. The main coil inductance changes a little bit when the position of the two coils changes. A middle value 360 μH was selected in the design stage. The rated output power is designed as 8 kW with the maximum efficiency of 97.1%. Due to the parameter variations, the maximum efficiency of 96% was reached at 7.7 kW.

Since the ratio between the input voltage and the output voltage is around 1, the transmit and receive coils are designed to have to same size. Thus, from (3), $L_{v1}=L_{f2}$. From Table I and (18), $$L_{f1} = L_{f2} \quad (35)$$

$$= \sqrt{\frac{k_{max}U_{AB}U_{ab}}{\omega_0 P_{max}} \cdot L_1}$$

$$= \sqrt{\frac{0.32 \times \frac{2\sqrt{2}}{\pi} \times 425 \times \frac{2\sqrt{2}}{\pi} \times 450}{2\pi \times 79 \times 10^3 \times 8 \times 10^3} \cdot 360 \times 10^{-6}} H$$

$$\approx 67 \text{ μH}$$

The value of $C_{f1}$ and $C_{f2}$ can be calculated from (3), $$C_{f1} = C_{f2} = \frac{1}{\omega_0^2 L_{f1}} \approx 60 \cdot 6 \text{ nF} \quad (36)$$

$C_1$ and $C_2$ can also be calculated from (3)

$$C_1 = C_2 = \frac{1}{\omega_0^2(L_1 - L_{f1})} \approx 14 \text{ nF} \quad (37)$$

Then, a variation of $\Delta L_{e2}$ should be designed to increase the turn-off current for MOSFETs to achieve ZVS. Once the minimum turn-off current for ZVS is obtained, $\Delta L_{e2}$ can be designed using (34). For different MOSFET and dead-time setting, the minimum turn-off current is different. For a 8 kW system, usually a MOSFET with 80 A continuous conduction capability can be adopted. In the example implementation, Fairchild FCH041N60E N-Channel MOSFETs were chosen as the main switches. The switches are rated at 600V, 48A (75° C.) to 77A (25° C.). According to the parameters of the MOSFET, the calculated dead-time is 600 ns. In order to guarantee ZVS in this mode, the turn-off current must be large enough to discharge the junction capacitors within the dead-time, which can be represented by:

$$I_{OFF} \geq \frac{4 C_{oss} U_{AB,max}}{t_d} \quad (38)$$

where $U_{AB,MAX}$ is the maximum input voltage, $C_{oss}$ is the junction capacitance and $t_d$ is the dead-time. By using the MOSFET parameters, the turn-off current can be calculated, which should be larger than 2 A to realize ZVS. Thus, the minimum turn-off current $I_{OFF\_min}$ is designed to be 3 A.

By substituting (35)~(37) and $I_{OFF\_min}$ into (34), we can get $$\Delta L_{e2} = \frac{1}{4} L_{f2} I_{OFF\_min}^2 \cdot \omega_0^2 \cdot L_{f1} \cdot L_{f2}^2 \quad (39)$$

$$= \left( \frac{67}{4} + \frac{3^2 \cdot (2\pi \cdot 79 \times 10^3)^2 \cdot (67 \times 10^{-6})^2 \cdot 67}{2 \cdot \left(\frac{2\sqrt{2}}{\pi} \cdot 300\right)^2} \right) \mu H$$

$$\approx 21 \, \mu H$$

The equivalent inductance $L_{e2}$ is determined by $C_2$ and leakage inductance $L_{s2}$. Because $L_{s2}$ is related to the self-inductance and coupling, it is more complicated if $L_{s2}$ is tuned to change the value of $L_{e1}$. It is easier to tune $C_2$ to change the value of $L_{e2}$. From (3), $$\Delta L_{e2} = \frac{1}{\omega_0^2 C_2} - \frac{1}{\omega_0^2 (C_2 + \Delta C_2)} \quad (40)$$

Then, the variation of $C_2$ can be calculated:

$$\Delta C_2 = \frac{\omega_0^2 \cdot \Delta L_{e2} \cdot C_2^2}{1 - \omega_0^2 \cdot \Delta L_{e2} \cdot C_2} \approx 1.1 \, nF \quad (41)$$

Thus, to achieve ZVS, the value of $C_2$ should be tuned such that it is 1.1 nF larger than the value calculated by (37). All the designed values for the example compensation network are listed in Table II.

TABLE II

COMPENSATION NETWORK PARAMTERS

| Parameter | Design value |
|---|---|
| $L_{f1}$ | 67 µH |
| $L_{f2}$ | 67 µH |
| $C_{f1}$ | 60.6 nF |
| $C_{f2}$ | 60.6 nF |
| $C_1$ | 14 nF |
| $C_2$ | 15.1 nF |

Figure 6:
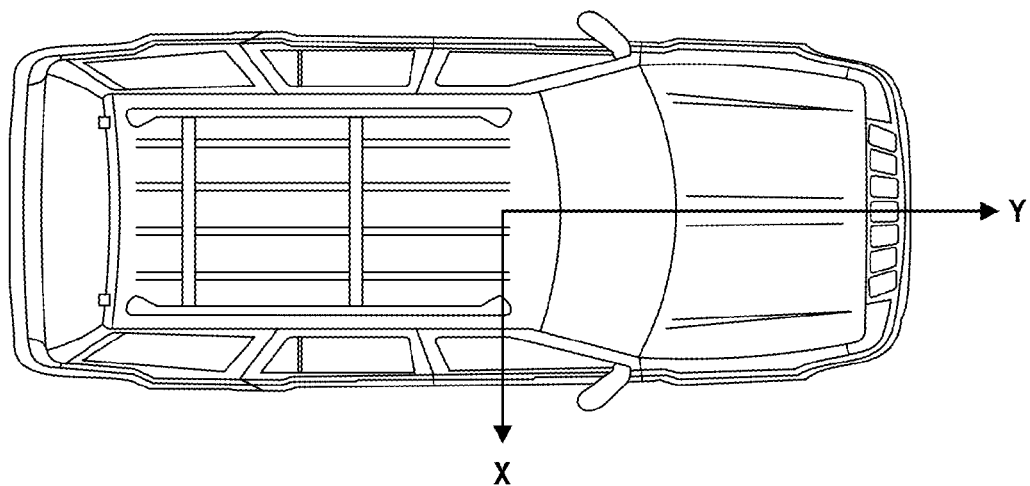
FIG. 6 is a diagram of a vehicle illustrating two types of misalignments.

Both simulation and experiments are undertaken to verify the proposed double sided LLC compensation network and its tuning method. The circuit parameters have been shown in Table I and Table II. Two kinds of misalignments are defined, i.e. X-misalignment (door-to-door, or right-to-left), and Y-misalignment (front-to-rear), as shown in FIG. 6. When parking a car, the X-misalignment is much harder for the driver to adjust. So X-misalignments is chosen for the simulation and experiments. Various misalignments are reflected by the different coupling coefficients. In this section, three coupling coefficients, namely, k=0.18, 0.24, 0.32, corresponding to X=310 mm, 230 mm, and 0 mm respectively, as well as three output voltages, $U_b$=300V, 400V, 450V, are chosen as case studies. The switching frequency is fixed at 79 kHz for all the cases.

Figure 7A:
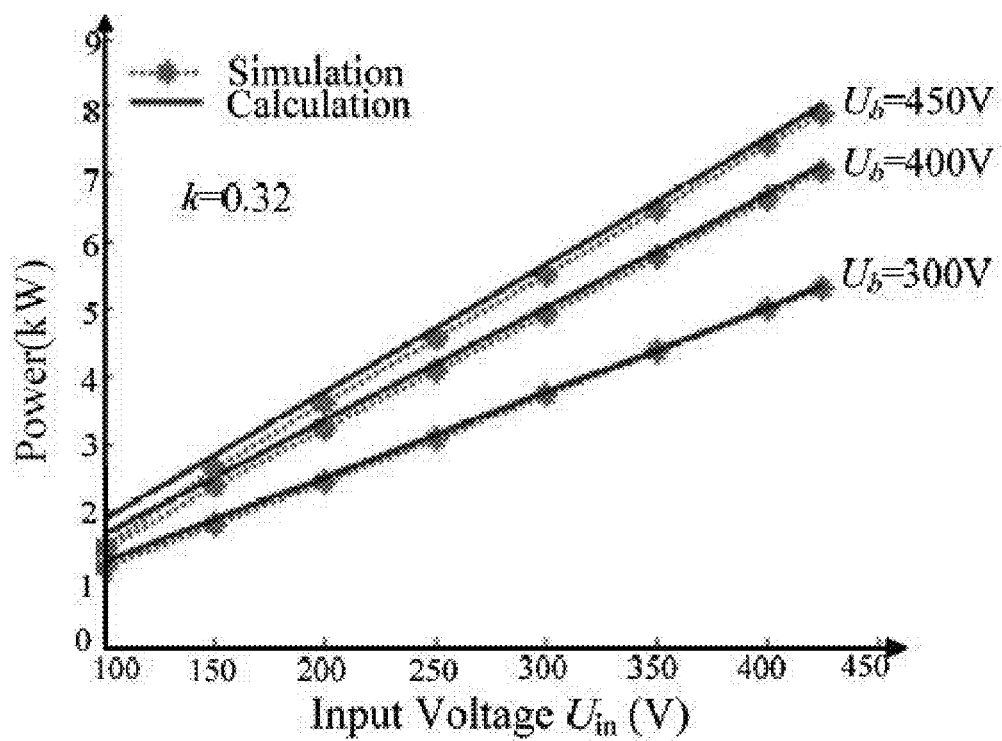
FIGS. 7A-7C are graphs depicting simulation and theoretical calculation results of the power levels for the designed system.
Figure 7B:
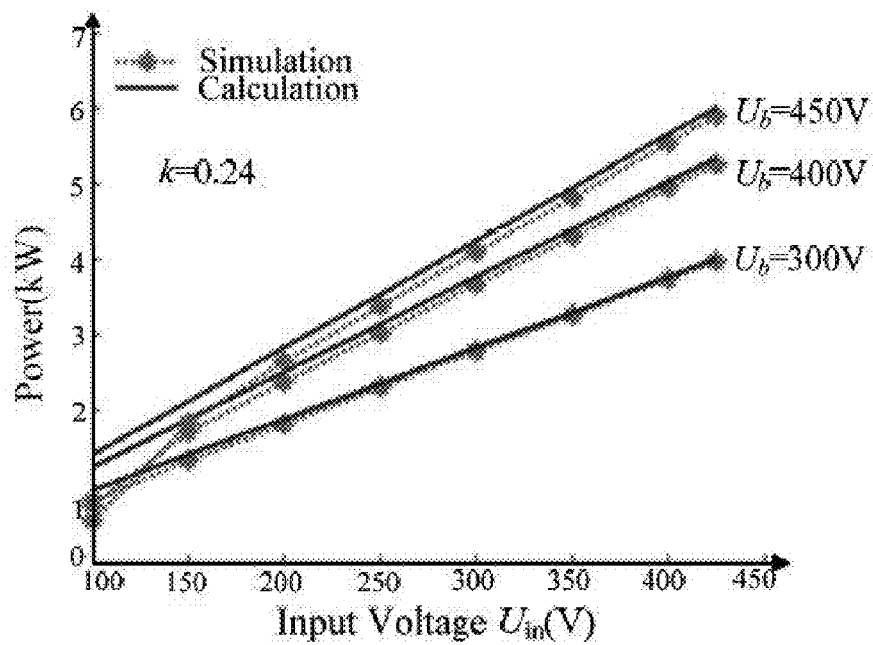
Figure 7C:
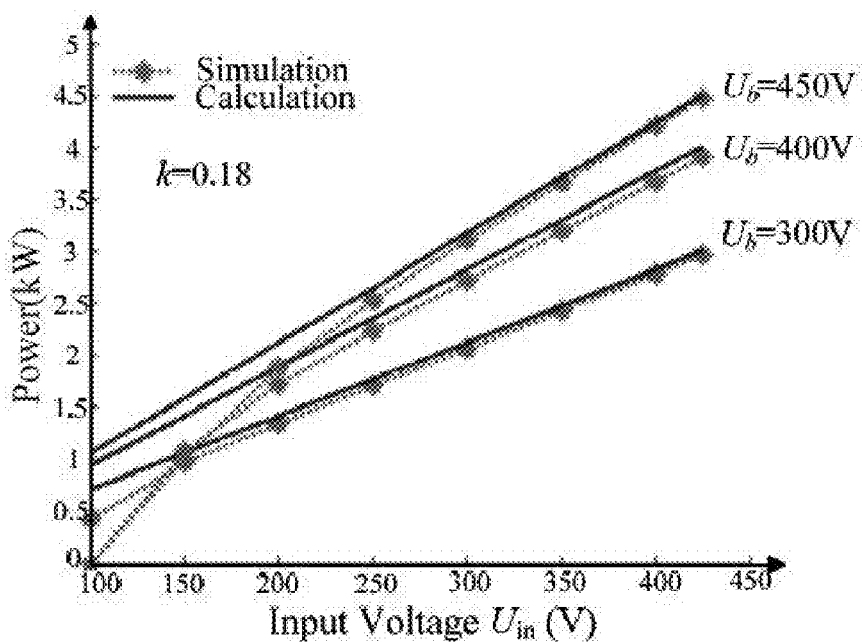

A model was built in LTspice to simulate the performance of proposed topology. The simulation results for different coupling coefficients, input voltages and output voltages were obtained. FIGS. 7A-7C show the comparison between simulated and calculated output power for various conditions. The output power varies linearly with the input voltages for different coupling coefficients and output voltages.

Figure 8:
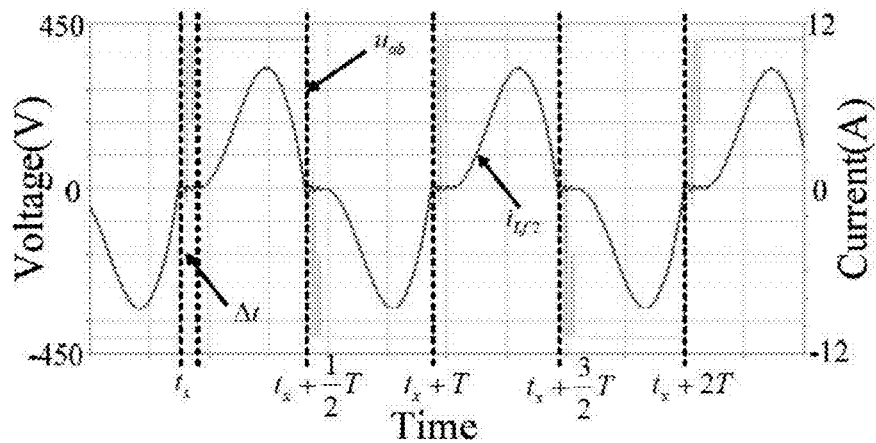
FIG. 8 is a graph depicting simulation waveforms of output voltage $u_{ab}$ and current through diodes $i_{Lf2}$ when $U_{in}$=150V, $U_b$=450V.
Figure 9A:
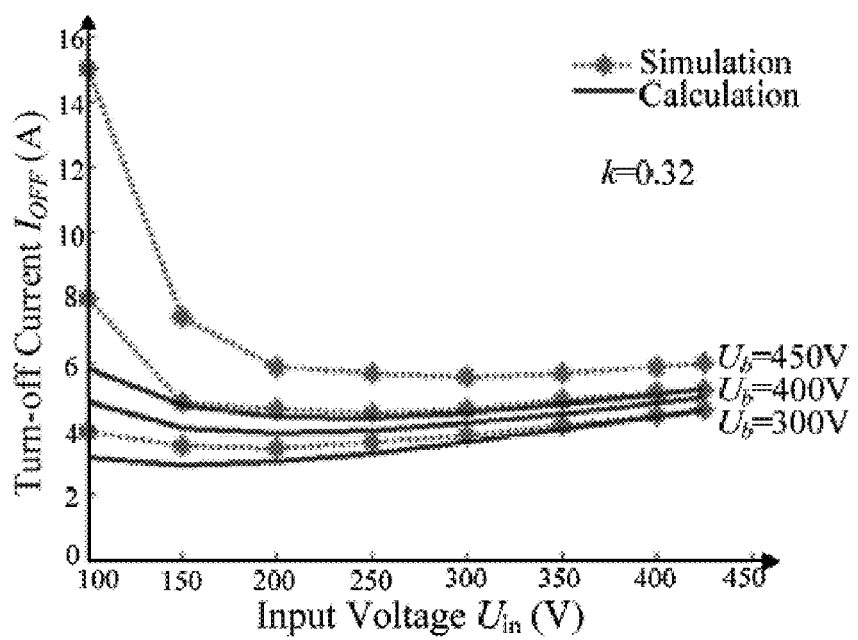
FIGS. 9A-9C are graphs depicting simulation and theoretical results of the MOSFETs turn-off current $I_{OFF}$ with k=0.32, k=0.24, k=0.18, respectively.
Figure 9B:
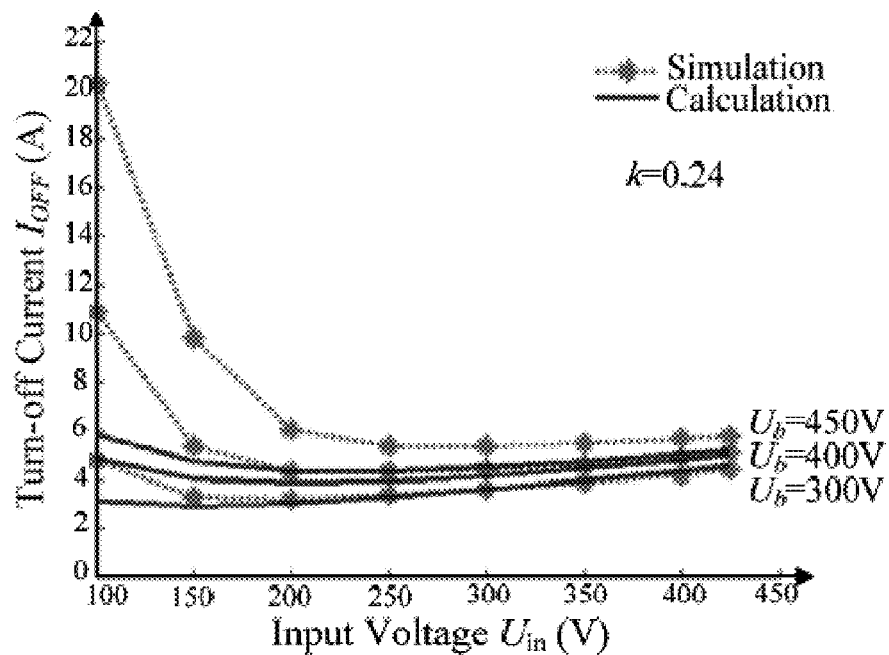
Figure 9C:
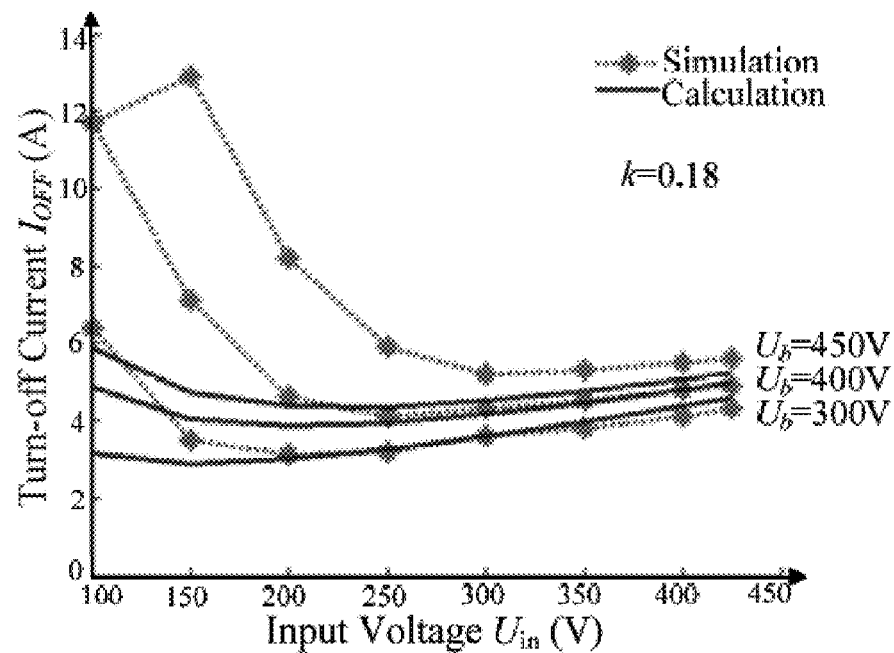

For high input voltage and high coupling coefficients, the simulation and theoretical analysis agree well with each other. But for low input voltage and low coupling coefficients, the simulation does not agree well with the analytical results. This is because at low input voltage and low coupling coefficient, the diodes at the secondary side do not conduct all the time between $t_x+n \cdot T/2$ and $t_x+(n+1) \cdot T/2$, which is shown in FIG. 8. A similar situation can also be found in the comparison results of turn-off current, as shown in FIGS. 9A-9C.

Figure 10A:
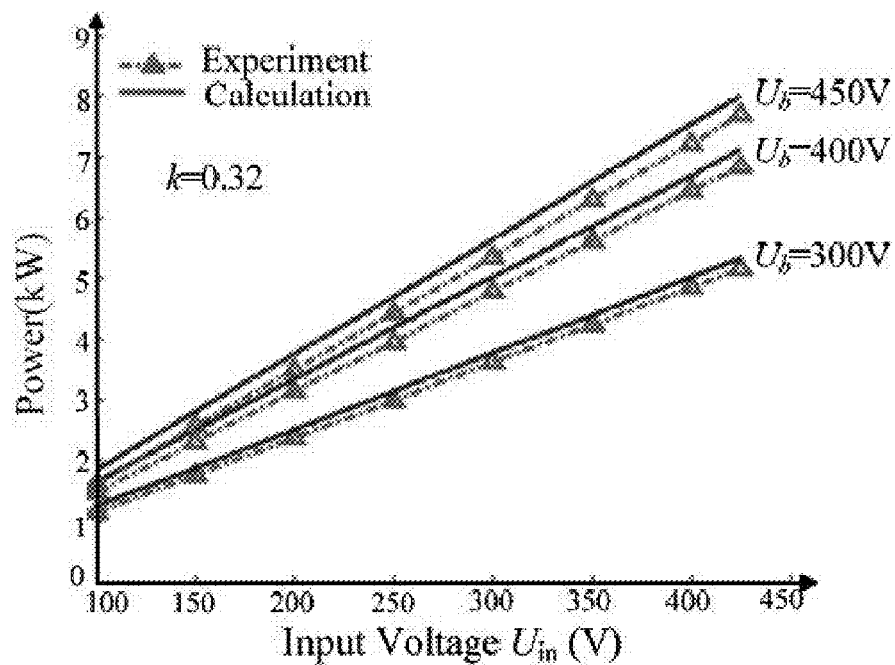
FIGS. 10A-10C are graphs depicting experimental and theoretical calculation results of the power levels for the wireless charger system with k=0.32, k=0.24, k=0.18, respectively.
Figure 10B:
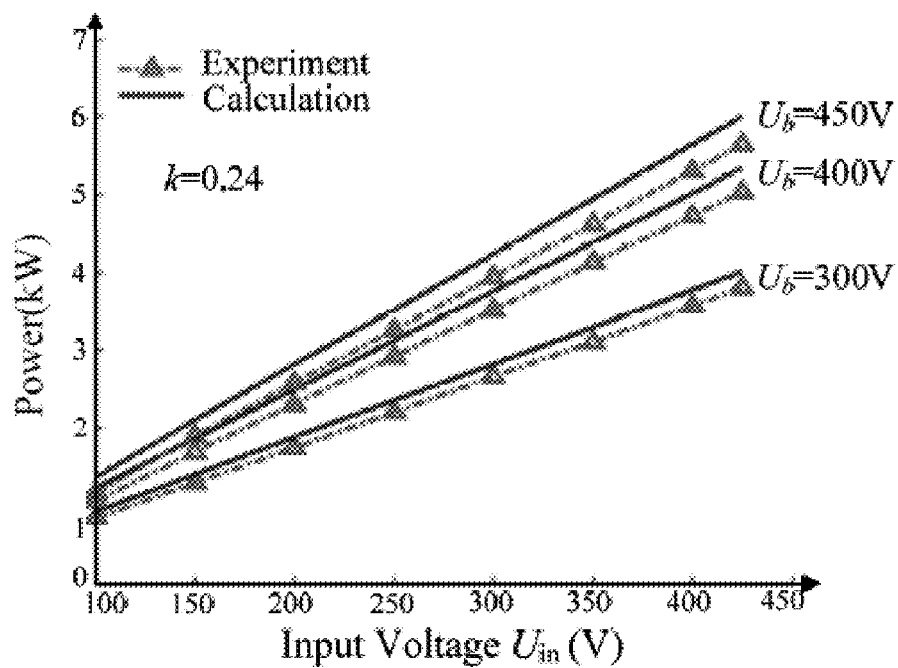
Figure 10C:
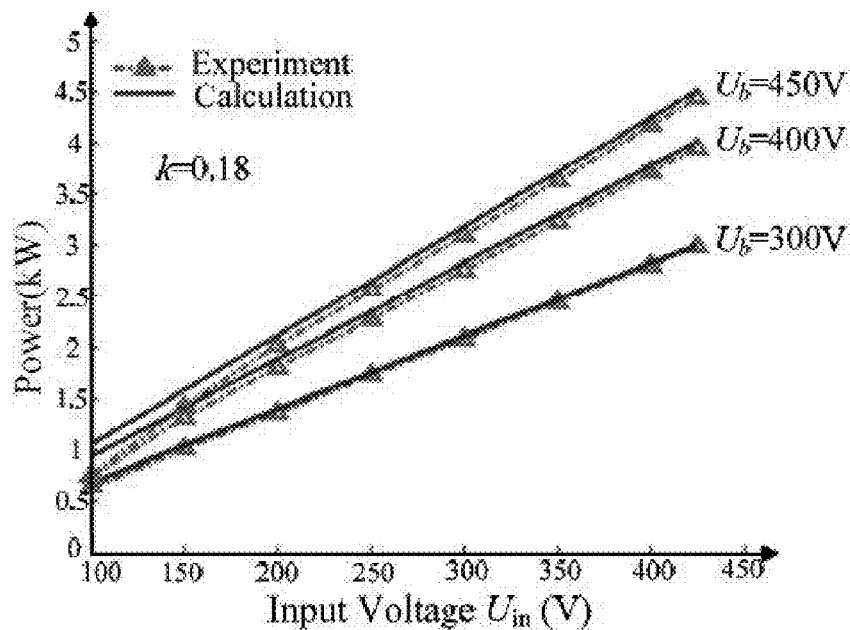

In the experimental set up, the coil dimension is 800 mm in length and 600 mm in width. The gap between the two coils is 200 mm. A 10 µF capacitor ($C_o$) and 10 µH inductor ($L_o$) are selected as the output filter. FIGS. 10A-10C show the comparison of experimental and simulation output power as a function of input voltage for three coupling coefficients and three output voltages. Different coupling coefficients are obtained by adjusting the gap and misalignment between sending and receiving coils. The output power matches well between simulation and experimental results, and they vary linearly with the input voltage. The same inconsistency phenomenon happens at the low input voltage and low coupling conditions as mentioned earlier. The calculated and simulated maximum efficiency is 97.1%. Because of the resistance and parameter variations in the real system, the maximum efficiency of 96% was reached at 7.7 kW output power, which is a little lower than the simulated result.

Figure 11A:
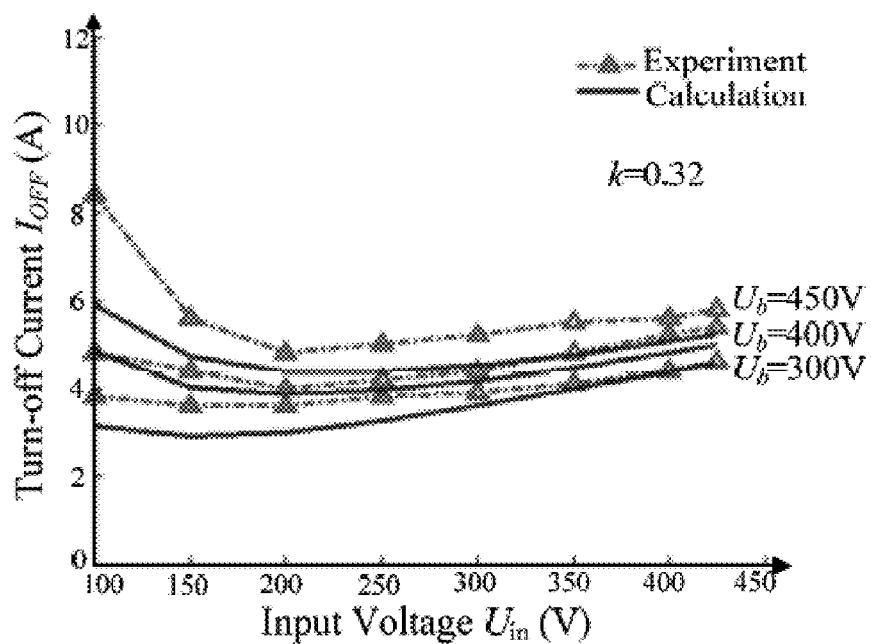
FIGS. 11A-11C are graphs depicting experimental and theoretical calculation results of the MOSFETS turn-off current $I_{OFF}$ with k=0.32, k=0.24, k=0.18, respectively.
Figure 11B:
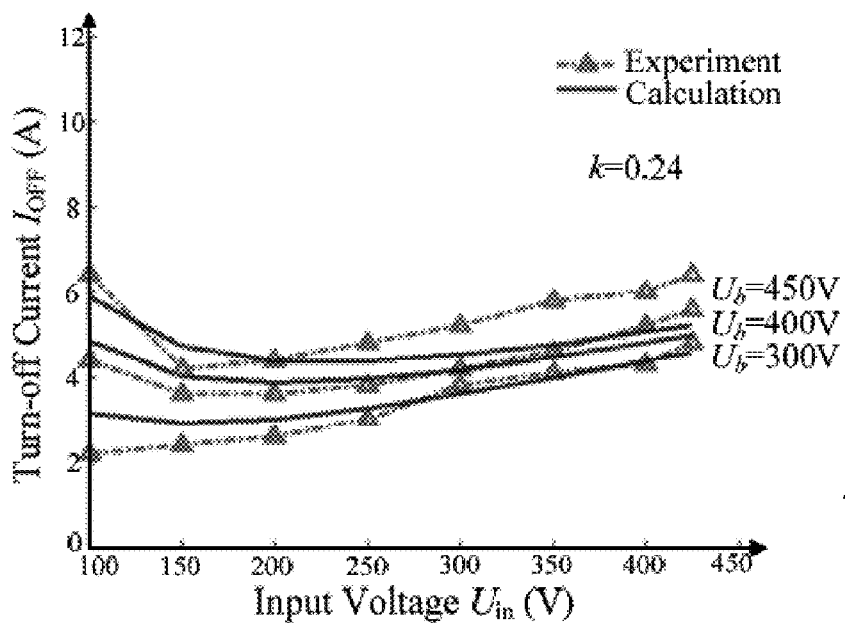
Figure 11C:
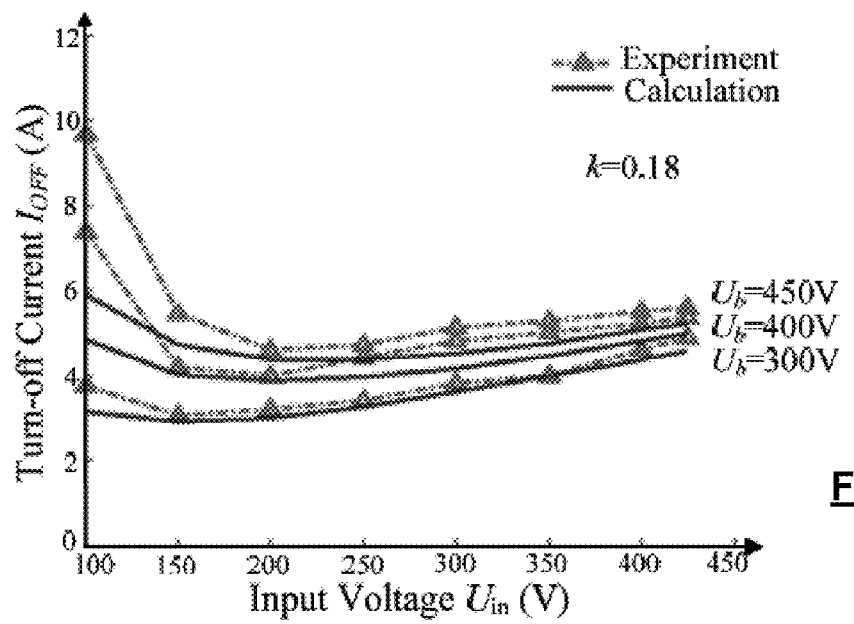
Figure 12A:
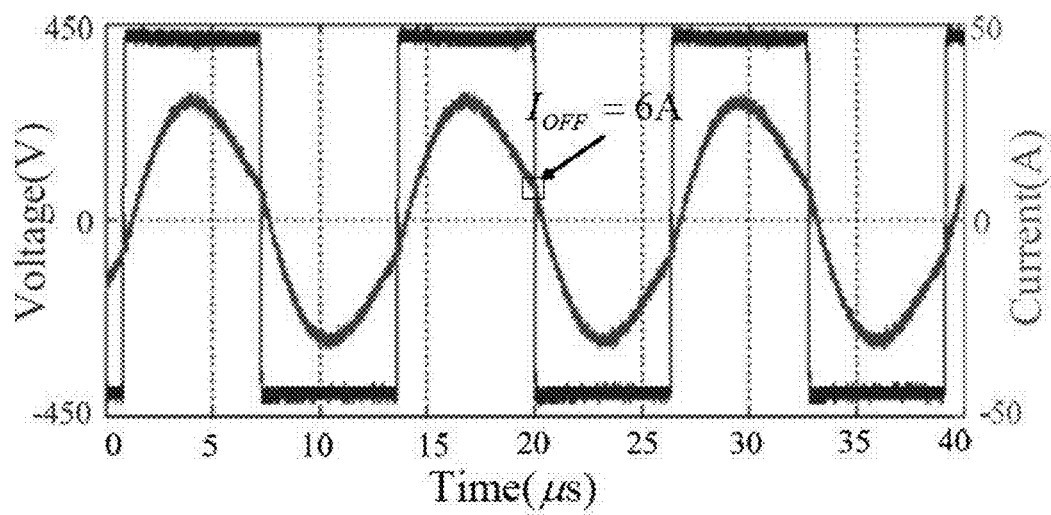
FIGS. 12A and 12B are graphs depicting waveforms of the input voltage $u_{AB}$ and current $i_{Lf1}$ and output voltage $u_{ab}$ and current $i_{Lf2}$ when deliver 7.7 kW power.
Figure 12B:
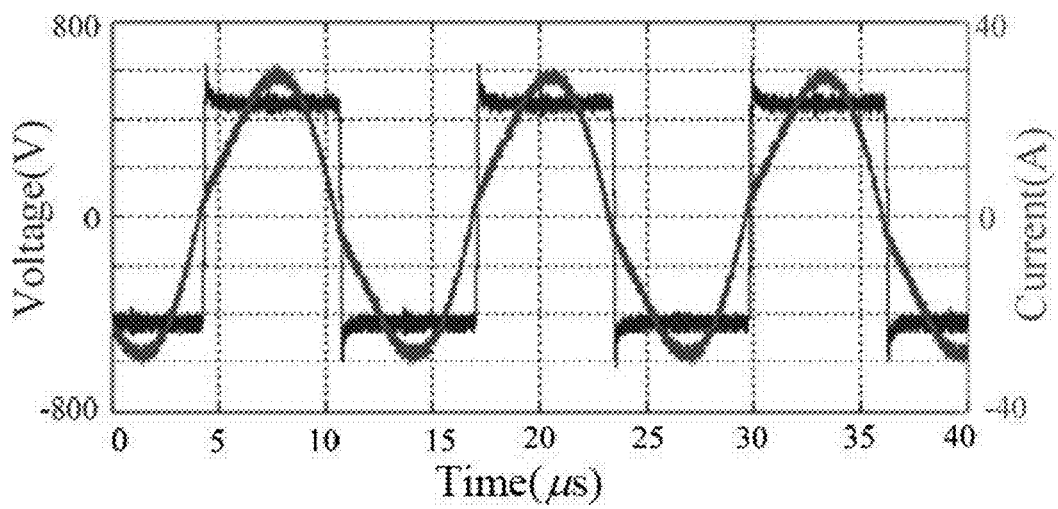

FIG. 11A-11C show the comparison of experimental and theoretical calculated turn-off currents of the MOSFETs. The experimental results agree well with the analytical results. The sending side waveforms and receiving side waveforms are shown in FIGS. 12A and 12B when the system operates at steady state delivering 7.7 W to the load. At this operating point, input voltage $U_{in}$=425V, output voltage $U_b$=450V, coupling coefficient k=0.32. The results indicate a good ZVS condition with $I_{OFF}$=6 A. The turn-off current maintains higher than required, while it is quite small relative to the peak current.

Figure 13A:
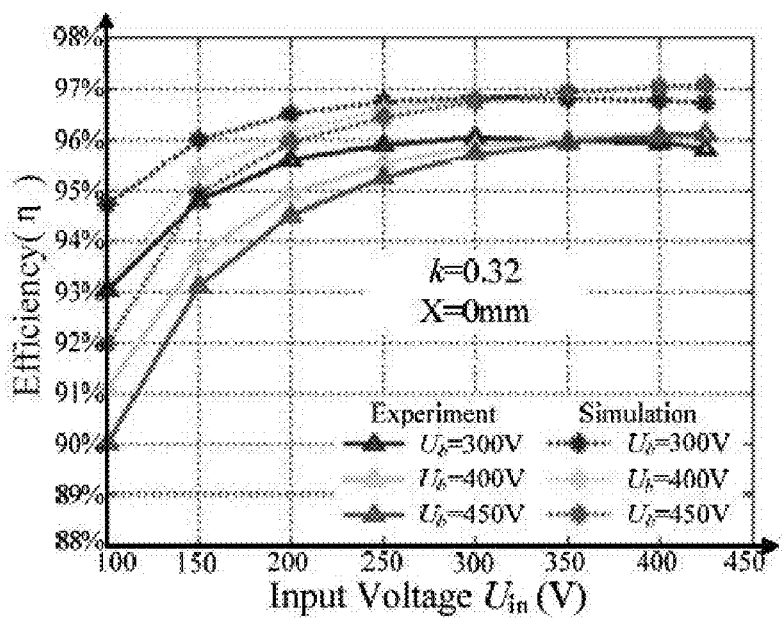
FIGS. 13A-13C are graphs depicting simulation and experimental efficiencies of the system when output voltages are 300V, 400V and 450V at different X-misalignments.
Figure 13B:
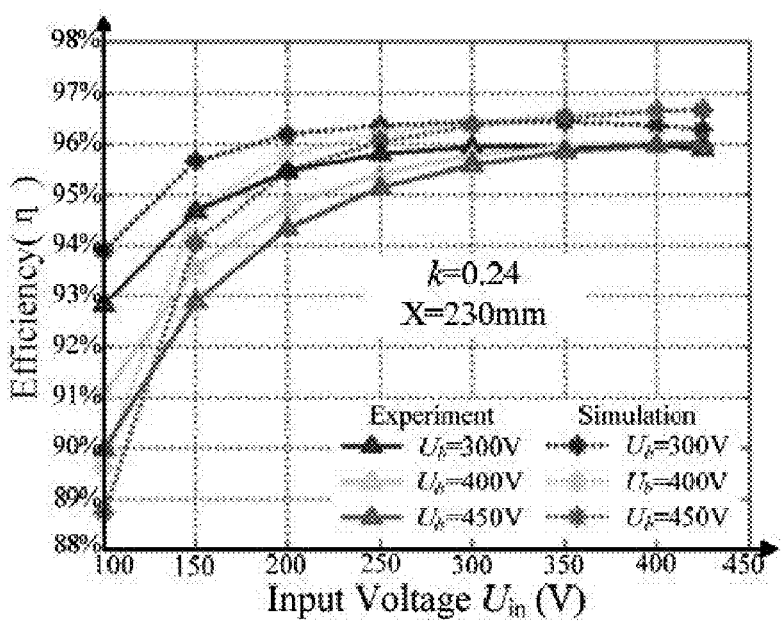
Figure 13C:
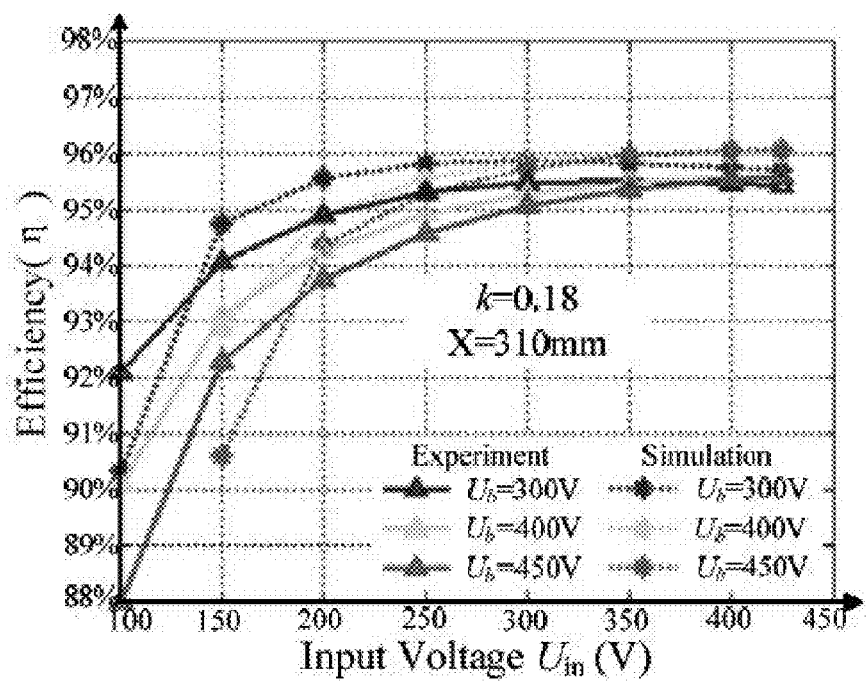

FIG. 13A-13C show the simulation and experimental efficiencies from DC power source to the battery load for the proposed double-sided LCC compensation network for wireless power transfer system. From FIG. 13C, it can be seen that the efficiency is very high even at a large X-misalignment condition. The maximum simulated efficiency is 97.1%, while the maximum measured efficiency is about 96% when $U_{in}$=425V, $U_b$=450V and k=0.32 as shown in FIG. 13A.

Figure 14:
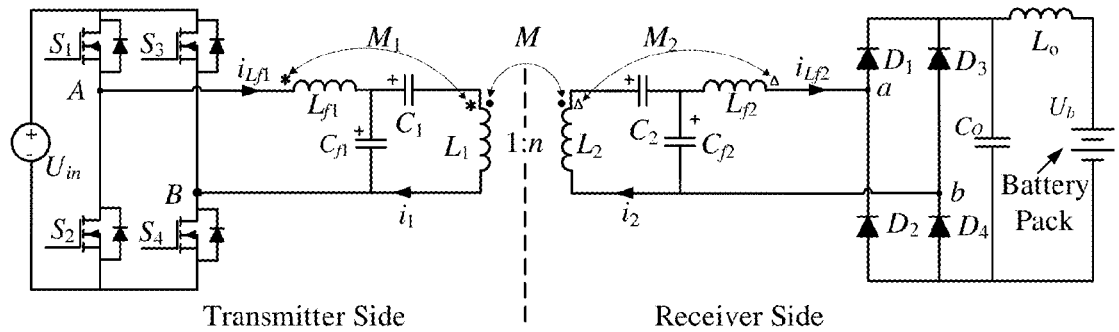
FIG. 14 is a schematic of an alternative embodiment of an integrated double-sided LCC compensation topology for wireless power transfer.

In an alternative embodiment, not only the two main coils, $L_1$ and $L_2$ are coupled to each other, but the main coil and the secondary coil on the same side are coupled with each other as shown in FIG. 14. That is $L_1$ is coupled with $L_{f1}$ and $L_2$ is coupled with $L_{f2}$. Consequently, $L_{f1}$ and $L_{f2}$ share the ferrite core and space with the main coil and thereby reduce the overall size of the system. Copper wire usage is also reduced in this alternative embodiment. The mutual inductances are M, $M_1$, $M_2$, respectively.

$$M = k\sqrt{L_1 L_2},$$

$$M_1 = k_1 \sqrt{L_1 L_{f1}},$$

$$M_2 = k_2 \sqrt{L_2 L_{f2}}. \quad (42)$$

where k, $k_1$, and $k_2$ are the coupling coefficients.

$M_1$ and $M_2$ are considered as constant while M varies with the changing of the vehicle ground clearance and misalignment. In this disclosure, the range of coupling coefficient is limited between 0.14 and 0.30 according to the coil design. Generally, the wireless power transfer system for hybrid electric or electric vehicles has a large leakage inductance but a small mutual inductance. Only the mutual inductance has contribution to the power transfer. So it is essential to compensate the self-inductance. Usually, the self-inductance is compensated by adding a series capacitor. For simplicity, in this disclosure the main coils on both the transmitter and receiver sides are designed as the same.

In the alternating current analysis, the square-wave input voltage and output voltage are replaced by their first fundamental sinusoidal equivalents. The power transferred is assumed to be only through the fundamental component and the contribution of all the high order harmonics is ignored. The internal resistances on all inductors and capacitors are neglected. The two main coils L1 and L2 can be regarded as a transformer which can be equivalent to two decoupled circuits containing controlled sources. So the decoupled model of the compact wireless charger system can be obtained, as shown in FIG. 15B.

Figure 15A:
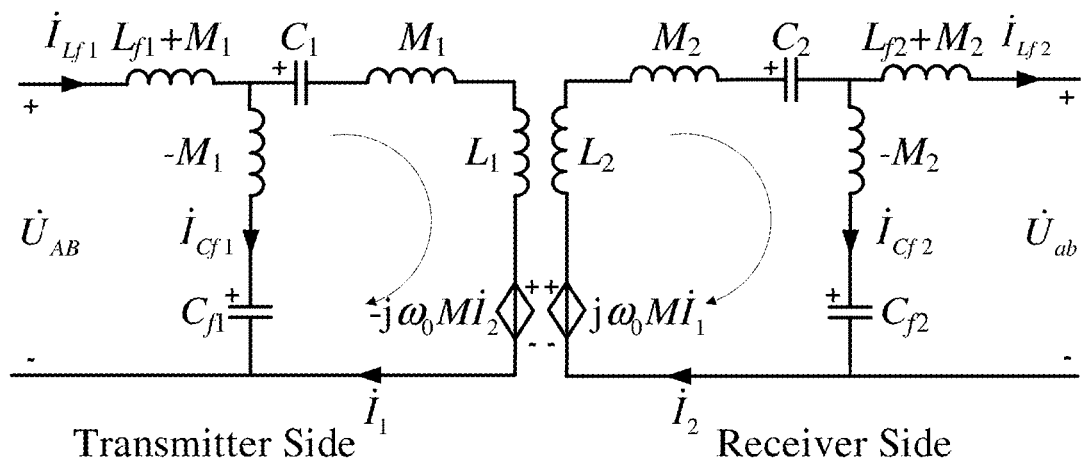
FIG. 15A is a schematic of an equivalent decoupled circuit model for the integrated LCC compensation topology.
Figure 15B:
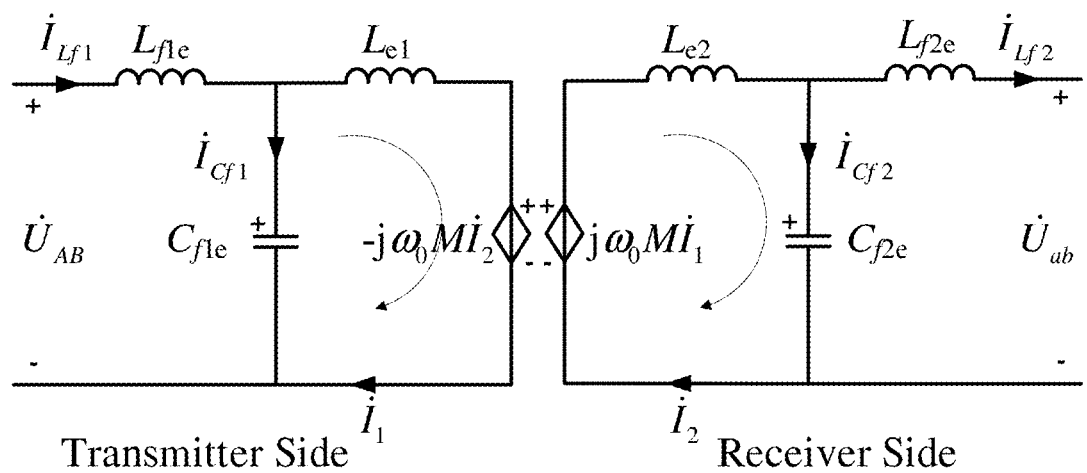
FIG. 15B is a schematic of a simplified equivalent circuit model for the integrated LCC compensation topology.

Assuming the circuit in FIGS. 15A and 15B are driven by sinusoidal voltage source, of which the angular frequency is $\omega_0$. The circuit can be simplified by the followed equations.

$$L_{f1e} = L_{f1} + M_1, \quad (43)$$

$$L_{f2e} = L_{f2} + M_2,$$

$$L_{e1} = L_1 + M_1 - \frac{1}{\omega_0^2 C_1},$$

$$L_{e2} = L_2 + M_2 - \frac{1}{\omega_0^2 C_2},$$

$$C_{f1e} = \frac{C_{f1}}{\omega_0^2 M_1 \cdot C_{f1} + 1},$$

$$C_{f1e} = \frac{C_{f1}}{\omega_0^2 M_1 \cdot C_{f1} + 1}.$$

Then the equivalent circuit can be simplified as shown in FIG. 15B.

Both sides are a simple LCL resonant converter. One of the characteristics of LCL resonant converters is that the output current is constant, only related to the input voltage, if it works at the resonant frequency. As for this work, on the sending side, assume:

$$L_{f1e} = L_{e1}, \quad (44)$$

$$\omega_0 = \frac{1}{\sqrt{L_{f1e} C_{f1e}}}. \quad (45)$$

From (43) and (45), the following relationship can be obtained $$\omega_0 = \frac{1}{\sqrt{L_{f1e} C_{f1e}}} = \frac{1}{\sqrt{L_{f1} C_{f1}}}. \quad (46)$$

From (43), (44) and (46), the following equation can be derived $$L_1 - L_{f1} = \frac{1}{\omega_0^2 C_1}. \quad (47)$$

From (46) and (47) $L_1$, $L_{f1}$, $C_{f1}$, $C_1$ are determined, the resonant frequency will be fixed. So the resonant frequency is independent of coupling coefficient and load condition.

By Kirchhoff's Laws, it is easy to get $$\dot{I}_1 = \frac{\dot{U}_{AB}}{j\omega_0 L_{f1e}}, \quad (48)$$

$$\dot{I}_{Lf1} = \frac{M \dot{I}_2}{L_{f1e}}. \quad (49)$$

Similarly, on the receiver side, when $L_{f2e} = L_{e2}$ and $\omega_0 = 1/\sqrt{L_{f2e} C_{f2e}}$, the following equations can be obtained $$\dot{I}_{Lf2} = \frac{M \dot{I}_1}{L_{f2e}}, \quad (50)$$

$$\dot{I}_2 = -\frac{\dot{U}_{ab}}{j\omega_0 L_{f2e}}. \quad (51)$$

Substitute (42), (51) and (42), (48) into (49) and (50) respectively, we can get $$\dot{I}_{Lf1} = -\frac{k\sqrt{L_1 L_2} \, \dot{U}_{ab}}{j\omega_0 L_{f1e} L_{f2e}}, \quad (52)$$

-continued $$\dot{I}_{Lf2} = \frac{k\sqrt{L_1 L_2}}{j\omega_0 L_{f1e} L_{f2e}} \dot{U}_{AB}. \quad (53)$$

Take $\dot{U}_{AB}$ as reference, and define $$\dot{\delta} = \frac{\dot{U}_{AB}}{U_{AB}}, \quad (54)$$

where $U_{AB}$ is the RMS value of the input voltage. It is obviously that $\dot{\delta}$ has features of unit vector.

As $\dot{U}_{ab}$ is a passive voltage, its direction is determined by the conduction mode of the diodes $D_1 \sim D_4$ of the rectifier. It should be in phase with $\dot{I}_{Lf2}$. So the following equation can be obtained $$\dot{U}_{ab} = U_{ab} \frac{\dot{\delta}}{j}. \quad (55)$$

Then (48), (51), (52), and (53) can be expressed as $$\dot{I}_1 = \frac{U_{AB}}{j\omega_0 L_{f1e}} \dot{\delta} = \frac{U_{AB}}{j\omega_0 (L_{f1} + M_1)} \dot{\delta}, \quad (56)$$

$$\dot{I}_2 = \frac{U_{ab}}{\omega_0 L_{f2e}} \dot{\delta} = \frac{U_{ab}}{\omega_0 (L_{f2} + M_2)} \dot{\delta}, \quad (57)$$

$$\dot{I}_{Lf1} = \frac{k\sqrt{L_1 L_2}}{\omega_0 L_{f1e} L_{f2e}} U_{ab} \dot{\delta} = \frac{k\sqrt{L_1 L_2}}{\omega_0 (L_{f1} + M_1)(L_{f2} + M_2)} U_{ab} \dot{\delta}, \quad (58)$$

$$\dot{I}_{Lf2} = \frac{k\sqrt{L_1 L_2}}{j\omega_0 L_{f1e} L_{f2e}} U_{AB} \dot{\delta} = \frac{k\sqrt{L_1 L_2}}{j\omega_0 (L_{f1} + M_1)(L_{f2} + M_2)} U_{AB} \dot{\delta}. \quad (59)$$

It is obvious that current $I_1$ on the transmitter coil $L_1$ is constant, only related to input voltage $U_{AB}$. This is very important if the transmitter coil transfers power to several receiver coils at the same time. Furthermore, when a PHEV/EV with a wireless charger is parked, the coupling coefficient of the main coils will be determined. As a result, the output current $i_{Lf2}$ is also constant, which only depends on the input voltage. This is suitable for battery charging.

From (54) and (58) it is obvious that the phase difference between input current $\dot{I}_{Lf1}$ and input voltage $\dot{U}_{AB}$ is zero. The power factor is 1. So the delivered power can be expressed as $$P = \frac{\sqrt{L_1 L_2}}{\omega_0 (L_{f1} + M_1)(L_{f2} + M_2)} \cdot k U_{AB} U_{ab}, \quad (60)$$

where $U_{AB}$ and $U_{ab}$ are RMS values of the input voltage and output voltage. The receiver side main coil size is limited by the space of the bottom of the car. Therefore, the sizes of the main coils and their inductances, $L_1$ and $L_2$ are limited. This will result in a limitation for the output power of the WPT system. It can be seen from (60) that the desired power can be got by designing proper inductances of the additional coils and proper couplings between additional coils and the main coils. Moreover, if delivering the same power from the transmitter side to the receiver side, the inductances of the additional coils will be smaller, compared with the one that has no couplings between the additional coils and the main coils.

Figure 16:
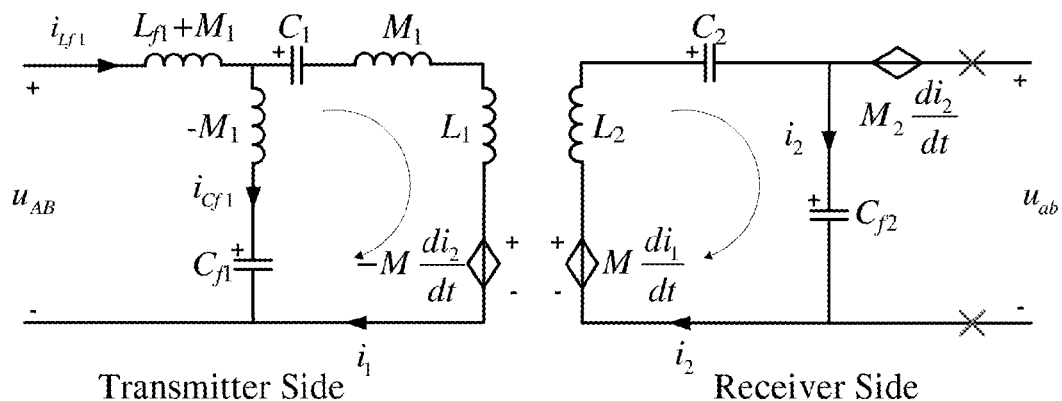
FIG. 16 is a schematic depicting an open circuit condition for the integrated LCC compensation topology.

As indicated by (59), the output current is related to input voltage $U_{AB}$, coupling coefficient k of the two main coils, and components parameters if the system operates at resonant frequency $\omega_0$. The system is a current source, independent of the load. FIG. 16 shows the open circuit of the system. The equivalent circuit of the sending side is the same as that shown in FIG. 15. However, as an open circuit, the current on $L_{f2}$ is zero and the receiving side equivalent circuit is different. The inductance $L_{f2}$ does not join the resonant circuit, but this does not change the resonant frequency of the resonant circuit according to the previous analysis. It just affects the voltage before the rectifier because of the coupling between $L_2$ and $L_{f2}$.

If the input voltage is a cosine waveform as shown below $$u_{AB} = \frac{U_{AB}}{\sqrt{2}} \cos(\omega_0 t), \quad (61)$$

then for the receiver side, the following equation can be derived $$\frac{d^2 u_C}{dt^2} + \omega_0^2 u_C = \frac{\omega_0^2 M}{L_{f1} + M_1} \frac{U_{AB}}{\sqrt{2}} \cos(\omega_0 t), \quad (62)$$

$$u_C = A\sin(\omega_0 t + \varphi) + \frac{\omega_0 M}{2(L_{f1} + M_1)} \frac{U_{AB}}{\sqrt{2}} t \sin(\omega_0 t). \quad (63)$$

where $u_C$ is the total voltage on the receiver side capacitors $C_2$ and $C_{f2}$. A and $\varphi$ in (63) are determined by the initial condition.

According to (63), the voltage on the capacitors will increase with time. This is not allowed. In practice, there will be always internal resistances in the circuit. For simplicity, the internal resistances of the circuit are equivalent to the resistances of the main coils ($L_1$ and $L_2$), the differential equation will be $$\frac{d^2 u_C}{dt^2} + \frac{R_2}{L_2} \frac{du_C}{dt} + \omega_0^2 u_C = \frac{\omega_0^2 M}{L_{f1} + M_1} \frac{U_{AB}}{\sqrt{2}} \cos(\omega_0 t), \quad (64)$$

where $R_2$ is the equivalent resistance of the receiver side in series with the main coil and is usually very small, $R_2 < 4L_2/C$. If $2\gamma = R_2/L_2$. Considering the initial condition, the voltage on the capacitors is $$u_C(t) = e^{-\gamma t} \frac{ML_2 \omega_0^2}{\sqrt{\omega_0^2 - \gamma^2} R_2(L_{f1} + M_1)} \frac{U_{AB}}{\sqrt{2}} \sin\sqrt{(\omega_0^2 - \gamma^2)} t + \quad (65)$$

$$\frac{ML_2 \omega_0}{R_2(L_{f1} + M_1)} \frac{U_{AB}}{\sqrt{2}} \sin(\omega_0 t)$$

The voltage on the capacitors will be steady over time as the second component of (67) shown. But the voltage will be high enough to cause the capacitors to break down if the battery is disconnected with the wireless charger suddenly when it is in operation. Therefore, open circuit protection is necessary for the integrated LCC compensation topology.

On the other hand, due to the resistance of the system, the power will only transfer to the battery when the input voltage is high enough. For the open circuit, when the system is in steady state, the voltage before the rectifier is $$u_{ab} = u_{Cf2} - u_{Lf2} = \frac{C_2}{C_2 + C_{f2}} \frac{L_2 + M_2}{L_{f1} + M_1} \frac{M\omega_0}{R_2} \frac{U_{AB}}{\sqrt{2}} \sin(\omega_0 t) \quad (66)$$

The battery voltage is $U_b$. If $|u_{ab}| < U_b$, there will be no power output. So $U_{AB}$ should be bigger than a certain value as described in (67) to ensure power transfer.

$$U_{AB} > \sqrt{2}\, U_b \frac{C_2 + C_{f2}}{C_2} \frac{L_{f1} + M_1}{L_2 + M_2} \frac{R_2}{M\omega_0}. \quad (67)$$

The operation of the integrated LCC compensation network for WPT is complex due to the high-order system and the resonant mechanism that the system has the same resonant frequency with and without inductor $L_{f2}$. The resonant circuit without $L_{f2}$ is formed when the diodes of the rectifier on the receiver side are all off. The system can operate in several stages within one switching cycle depending on the circuit component parameters, coupling coefficient between the two main coils, the input voltage, and load conditions (output voltage), when the operation frequency is fixed at the resonant frequency. Owing to the symmetry, only half switching cycle should be analyzed. In FIG. 14, the diodes of the rectifier on the receiver side only conduct when the voltage between nodes a and b is higher than the battery voltage. Characterized by the voltage between nodes a and b, there are three possible resonant stages, namely, positive clamped stage (stage P), negative clamped stage (stage N) and open stage (stage O) in the half cycle when S1, S4 are on and S2, S3 are off. As the proposed compensation topology is controlled by the input voltage, the WPT system will pass through four operation modes successively when the input voltage increase from zero to the maximum value. The operation modes are categorized by the conduction statuses of the rectifier as cutoff mode (CUTOFF), discontinuous conduction mode (DCM), and continuous conduction mode (CCM). Depending on the different sequential combinations of the three stages, DCM can be divided into DCM1 and DCM2.

The six equivalent circuit models of the integrated LCC compensation topology over a full cycle are given in FIGS. 17A-17F. According to the analysis above, it is necessary to consider the resistances of the circuit. In the following sections, the resistances of the circuit are equivalent to the resistances connected to the main coils as R1 and R2 shown in FIGS. 17A-17F. And only the first half cycle is analyzed.

Figure 17A:
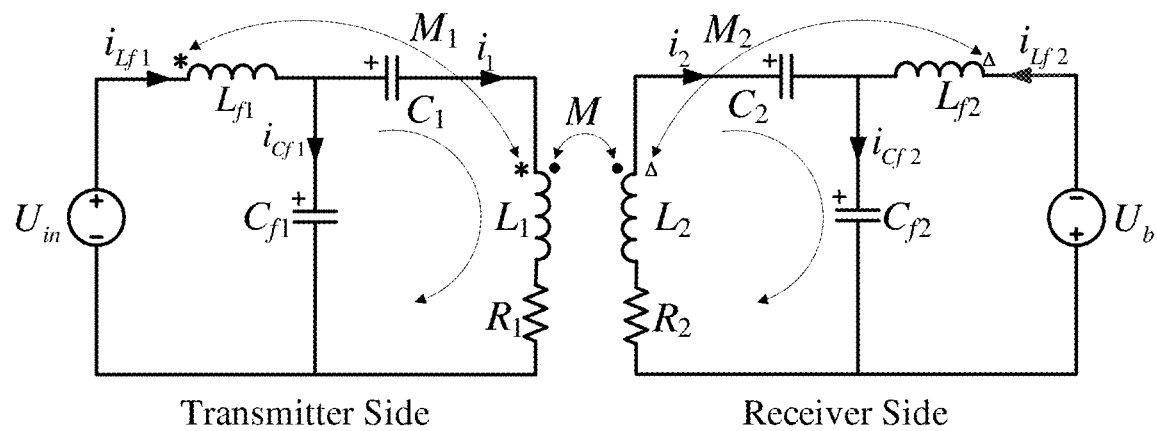
FIGS. 17A-17F are schematics of equivalent circuit models of the integrated LCC compensation topology over a full cycle.
Figure 17B:
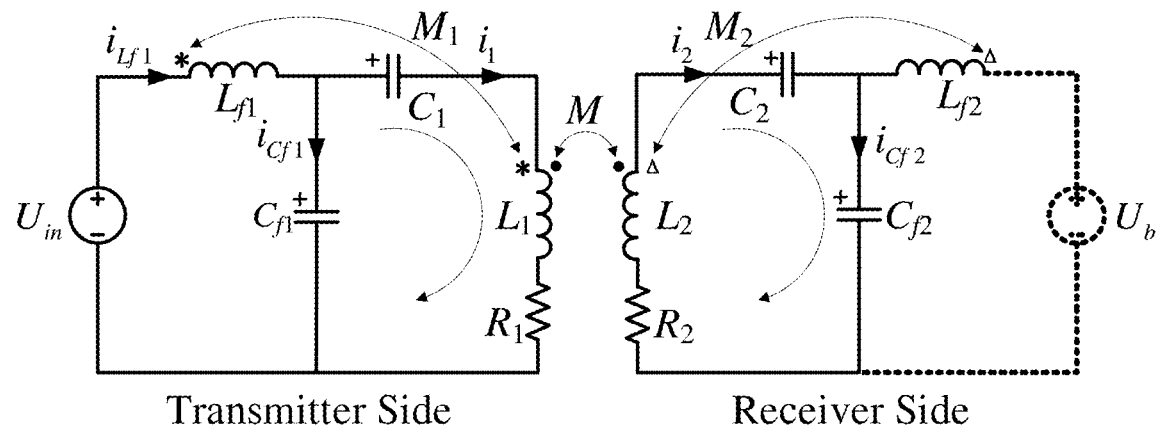

Open Stage (Stage O): Stage O, as shown in FIG. 17B, occurs when all of the diodes of the rectifier are off, the current on $L_{f2}$ is zero. Inductor $L_{f2}$ does not join the resonance with other circuit components, neither the battery. But as mentioned before, the system still has the same resonant frequency as other stages. During Stage O, the voltage between node a and b is lower than the battery voltage Ub. The differential equations can be expressed in a matrix form as $$\dot{x} = A_1 x + B_1 u, \quad (68)$$

where $$x = [\, i_{L_{f1}} \quad u_{C_1} \quad i_1 \quad i_2 \quad u_{C_2} \quad u_{C_{f1}} \quad u_{C_{f2}} \quad i_{L_{f2}} \,]^T, \quad (69)$$

$$A_1 = \frac{1}{\chi^I}\begin{pmatrix} 0 & a^I_{12} & a^I_{13} & a^I_{14} & a^I_{15} & a^I_{16} & a^I_{17} & 0 \\ 0 & 0 & \chi^I a^I_{23} & 0 & 0 & 0 & 0 & 0 \\ 0 & a^I_{32} & a^I_{33} & a^I_{34} & a^I_{35} & a^I_{36} & a^I_{37} & 0 \\ 0 & a^I_{42} & a^I_{43} & a^I_{44} & a^I_{45} & a^I_{46} & a^I_{47} & 0 \\ 0 & 0 & 0 & \chi^I a^I_{54} & 0 & 0 & 0 & 0 \\ \chi^I a^I_{61} & 0 & \chi^I a^I_{63} & 0 & 0 & 0 & 0 & 0 \\ 0 & 0 & 0 & \chi^I a^I_{74} & 0 & 0 & 0 & 0 \\ 0 & 0 & 0 & 0 & 0 & 0 & 0 & 0 \end{pmatrix}, \quad (70)$$

$$u = [\, U_{AB} \quad U_{ab} \,]^T, \quad (71)$$

$$B_1 = \frac{1}{\chi^I}\begin{bmatrix} b^I_{11} & 0 & b^I_{13} & b^I_{14} & 0 & 0 & 0 & 0 \\ 0 & 0 & 0 & 0 & 0 & 0 & 0 & 0 \end{bmatrix}^T. \quad (72)$$

The elements in the matrices and other parameters are shown in the appendix.

Negative Clamped Stage (Stage N): When the voltage between note a and b is negative and higher than the battery voltage, diodes D1 and D4 are off, while D2 and D3 are on as shown in FIG. 14, the battery will be connected to the circuit in reverse, as shown in FIG. 17A. Similarly, referring to the appendix, the following equation can be obtained $$\dot{x} = A_2 x + B_2 u. \quad (73)$$

Figure 17C:
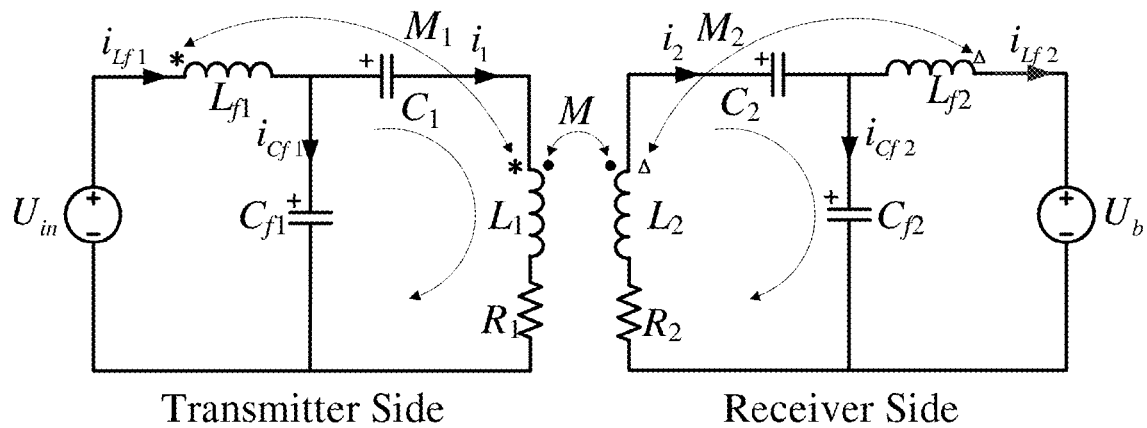
Figure 17D:
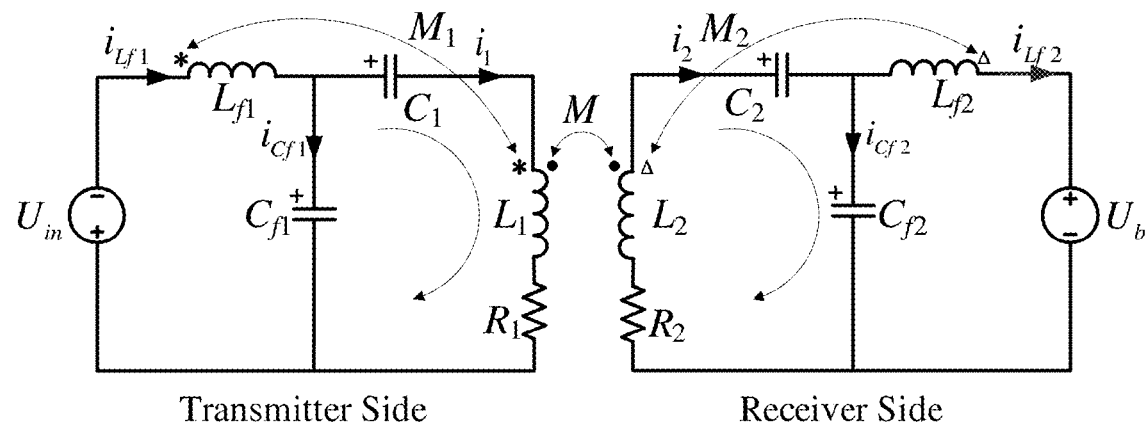
Figure 17E:
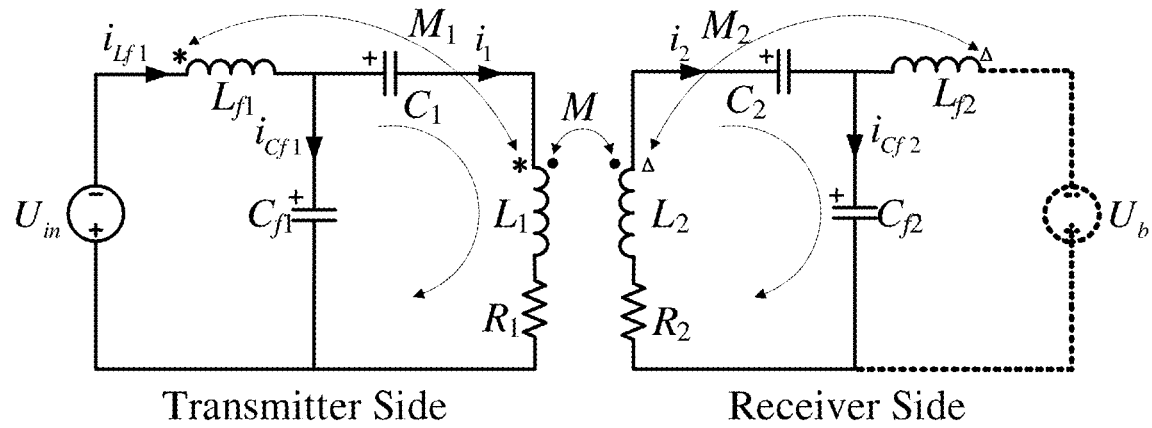
Figure 17F:
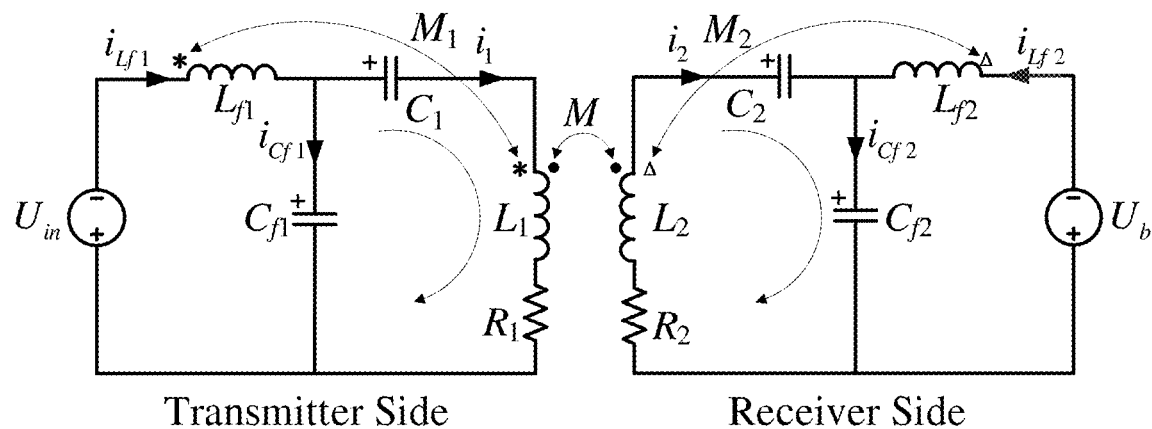

Positive Clamped Stage (Stage P): When the voltage between nodes a and b is positive and higher than the battery voltage, diodes $D_1$ and $D_4$ will be turned on while $D_2$ and $D_3$ turned off. As shown in FIG. 17C, the battery is directly connected to the resonant circuit. According to the appendix, the equation is $$\dot{x} = A_2 x + B_3 u. \quad (74)$$

Figure 18:
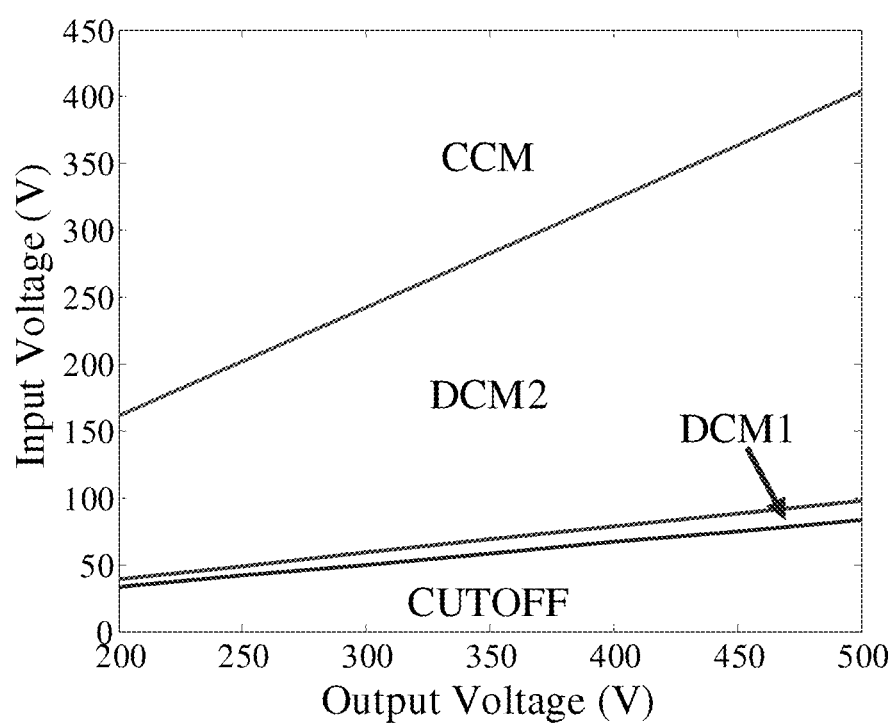
FIG. 18 is a diagram illustrating different operating modes for the integrated LCC compensation topology.

When operating near the resonant frequency and with the same load condition, the integrated LCC compensation wireless charger system passes through four operating modes as shown in FIG. 18 with the input voltage increasing. The first one is the cutoff mode (CUTOFF), followed by discontinuous conduction mode I (DCM1), discontinuous conduction mode II (DCM2), and continuous conduction mode (CCM). They are divided into the following three categories: CUTOFF, DCM, and CCM. The equations describing the modes are boundary value problems of ordinary differential equations. It is not possible to give analytical solutions for such high order differential equations. So in this work, the results are based on numerical solutions.

Figure 19A:
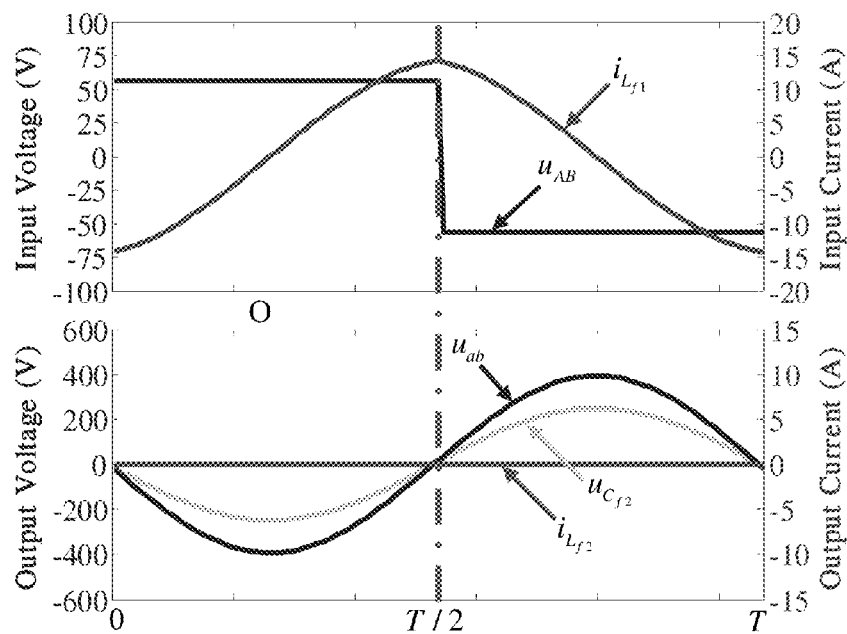
FIGS. 19A-19D are graphs illustrating waveforms for the different operating modes of the integrated LCC compensation topology.

1) Cutoff Mode (CUTOFF): There is no power transfer to the battery during the cutoff mode, only stage O is involved in this mode. The input voltage is small enough comparing to the output voltage and therefore, the voltage between nodes a and b never reaches $U_b$. This is caused by the resistances in the circuit and imperfect compensation. The equivalent circuit can be represented by FIG. 17B and the waveforms are shown in FIG. 19A. The equation describing the steady-state of the cutoff mode is (68) with boundary condition $x(0) = -x(T/2)$. This constraint boundary condition fits all of the operation modes.

Figure 19B:
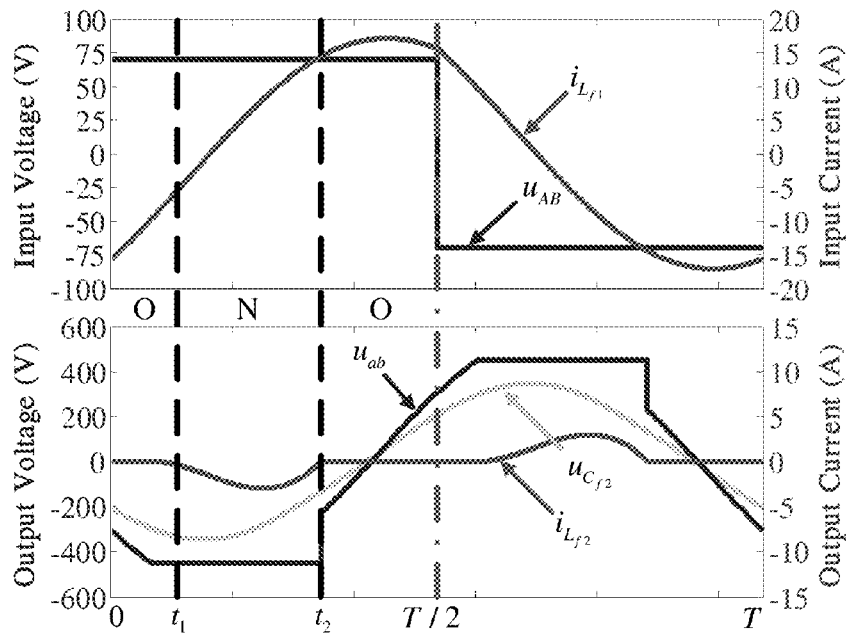
Figure 19C:
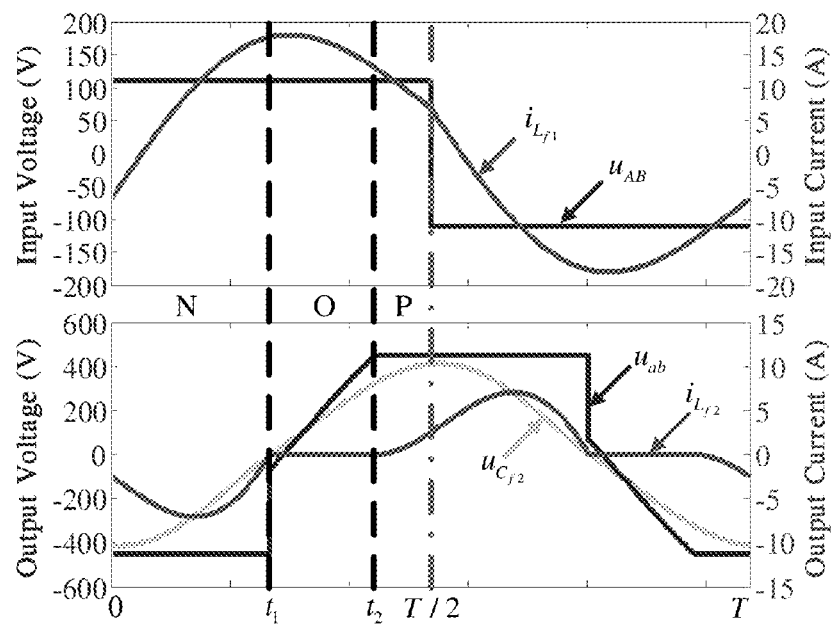

2) Discontinuous Conduction Mode (DCM): There are two cases of the discontinuous conduction mode as shown in FIGS. 19B and 19C. For case one (DCM1), which is after the cutoff mode, the system passes through stage O, stage N and stage O successively (O-N-O) in the first half cycle as shown in FIG. 19B. The equations describing it are $$\begin{cases} \dot{x} = A_1 x + B_1 u & 0 \le t \le t_1 \\ \dot{x} = A_2 x + B_2 u & t_1 \le t \le t_2 \\ \dot{x} = A_1 x + B_1 u & t_2 \le t \le T/2 \end{cases} \quad (75)$$

With the increase of input voltage, the WPT system operation mode changes from DCM1 (O-N-O) to DCM2 (N-O-P). In this process, the system will pass through a unique mode, namely, N-O. This mode is the boundary of DCM1 and DCM2 and it can be categorized into either of the two DCMs.

DCM2 mode, as shown in FIG. 19C, occurs when the input voltage rises to a level beyond DCM1 mode, the equations are $$\begin{cases} \dot{x} = A_2 x + B_2 u & 0 \le t \le t_1 \\ \dot{x} = A_1 x + B_1 u & t_1 \le t \le t_2 \\ \dot{x} = A_2 x + B_3 u & t_2 \le t \le T/2 \end{cases} \quad (76)$$

Figure 19D:
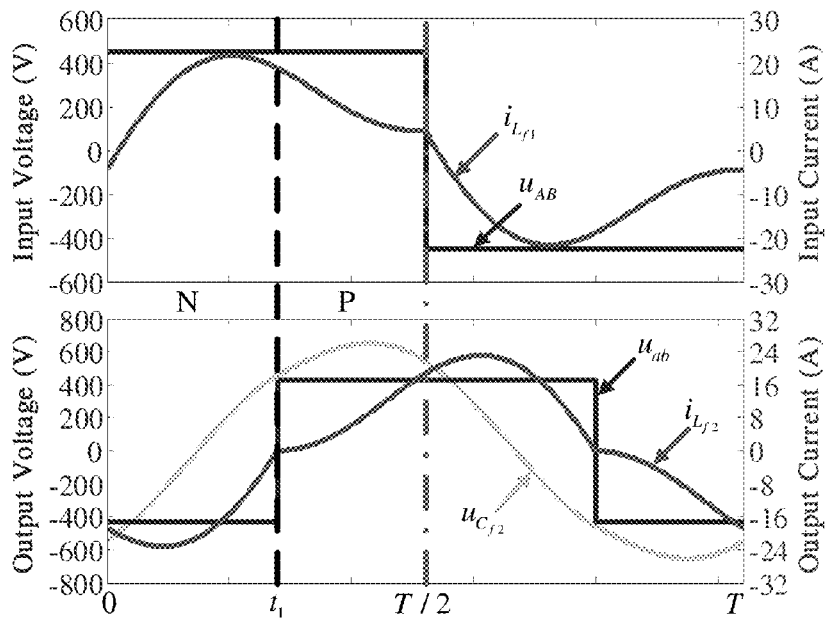

3) Continuous Conduction Mode (CCM): When the input voltage is high enough, the diodes of the rectifier will conduct all the time. The statuses of the circuit will shift between negative clamped stage (N) and positive clamped stage (P). The system will pass through N and P (N-P) in sequence during the first half resonant cycle as shown in FIG. 19D. The equations are shown as following $$\begin{cases} \dot{x} = A_2 x + B_2 u & 0 \le t \le t_1 \\ \dot{x} = A_2 x + B_3 u & t_1 \le t \le T/2 \end{cases} \quad (77)$$

The equations above can be solved using numerical method and the values of any states at any time can be obtained. Based on the analysis above, it is easy to get the output power and efficiency as $$P_{out} = \frac{2}{T} \int_0^{\frac{T}{2}} (U_b \cdot |i_{L_{f2}}|) dt, \quad (78)$$

$$\eta = \frac{P_{out}}{P_{in}} = \frac{\int_0^{\frac{T}{2}} (U_b \cdot |i_{L_{f2}}|) dt}{\int_0^{\frac{T}{2}} (U_{in} \cdot |i_{L_{f1}}|) dt}. \quad (79)$$

Figure 20:
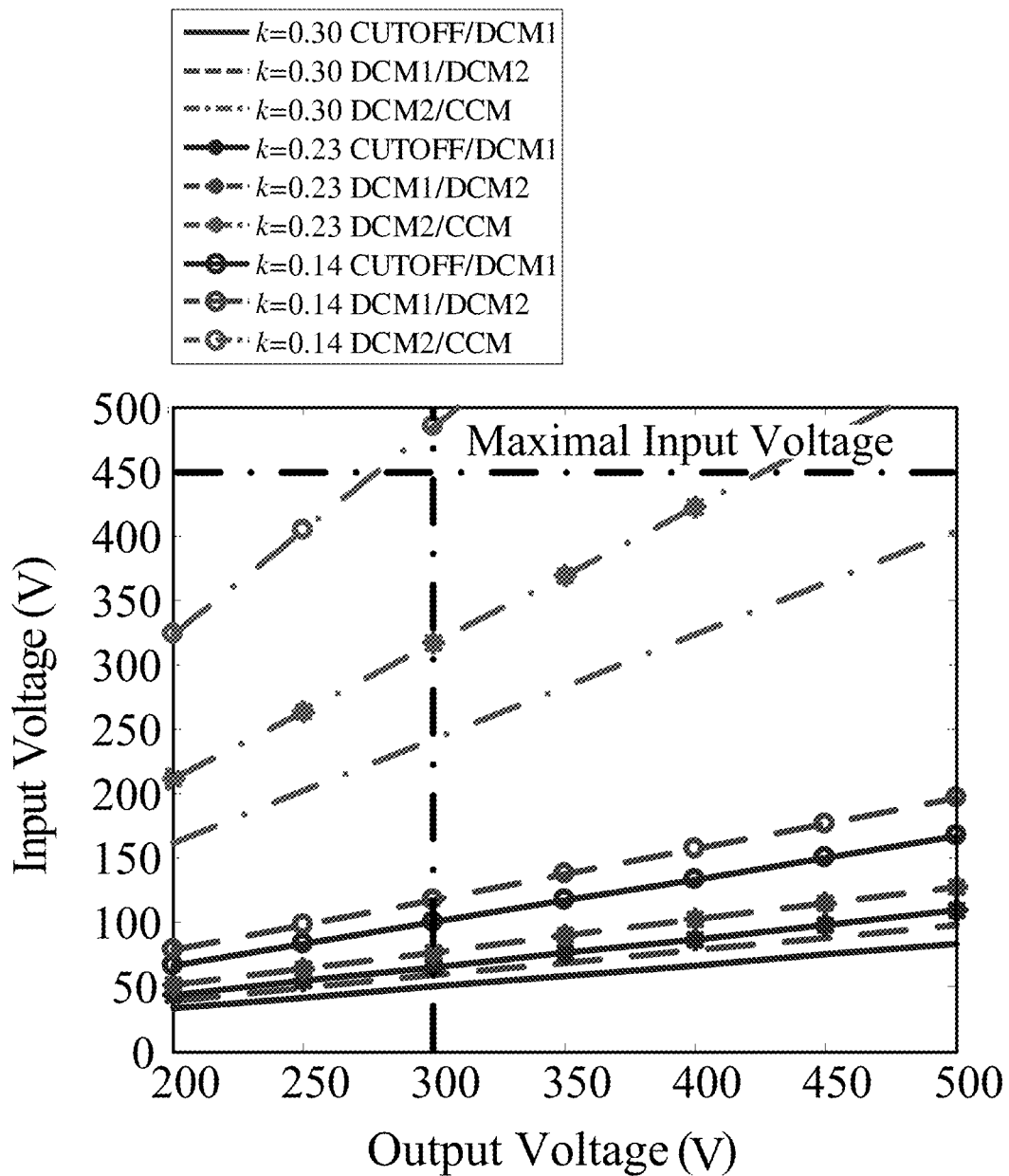
FIG. 20 is a graph depicting the relationship between efficiency and the different operating modes.

It can be seen that both the output power and efficiency of the WPT system are related to the operation mode. FIG. 20 illustrates the relationship between efficiency and operation mode. With the increasing input voltage, the efficiency will increase sharply during DCM1 mode and the rate of increase slows down when the system enters into DCM2 mode. At the end of the DCM2 mode and the entire CCM mode the efficiency will be stabilized at the maximal efficiency.

The fundamental element approximation is accurate enough when the system is operating at continuous conduction mode. However, if the system is operating at DCM modes, the error cannot be ignored. So it is essential to determine the range of different operation modes with various output voltage (battery voltage). The misalignments are inevitable in the wireless charger for EV/HEV, thus, it is of significant importance to analyze the impact of various coupling coefficients on the range of each operation mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX $$\chi^I M^2 L_{f1} - L_1 L_2 L_{f1} + L_2 M_1^2 \quad (A.1)$$

$$a_{12}^I = -L_2 M_1, \ a_{13}^I = -L_2 M_1 R_1, \ a_{14}^I = -MM_1 R_2, \quad (A.2)$$

$$a_{15}^I = a_{17}^I = -MM_1, \ a_{16}^I = -M^2 + L_1 L_2 + L_2 M_1;$$

$$a_{32}^I = L_2 L_{f1}, \ a_{33}^I = L_2 L_{f1} R_1, \ a_{34}^I = ML_{f1} R_2,$$

$$a_{35}^I = a_{37}^I = ML_{f1}, \ a_{36}^I = -L_2 L_{f1} - L_2 M_1;$$

$$a_{42}^I = ML_{f1}, \ a_{43}^I = ML_{f1} R_1, \ a_{44}^I = (L_1 L_{f1} - M_1^2) R_2,$$

$$a_{45}^I = a_{47}^I = L_1 L_{f1} - M_1^2, \ a_{46}^I = -ML_{f1} - MM_1;$$

$$a_{23}^I = \frac{1}{C_1}, \ a_{54}^I = \frac{1}{C_2}, \ a_{61}^I = -a_{63}^I = \frac{1}{C_{f1}}, \ a_{74}^I = \frac{1}{C_{f2}}.$$

$$b_{11}^I = M^2 - L_1 L_2, \ b_{13}^I = L_2 M_1, \ b_{14}^I = MM_1. \quad (A.3)$$

$$A_2 = \frac{1}{\chi^{II}} \begin{pmatrix} 0 & a_{12}^{II} & a_{13}^{II} & a_{14}^{II} & a_{15}^{II} & a_{16}^{II} & a_{17}^{II} & 0 \\ 0 & 0 & \chi^{II} a_{23}^{II} & 0 & 0 & 0 & 0 & 0 \\ 0 & a_{32}^{II} & a_{33}^{II} & a_{34}^{II} & a_{35}^{II} & a_{36}^{II} & a_{37}^{II} & 0 \\ 0 & a_{42}^{II} & a_{43}^{II} & a_{44}^{II} & a_{45}^{II} & a_{46}^{II} & a_{47}^{II} & 0 \\ 0 & 0 & 0 & \chi^{II} a_{54}^{II} & 0 & 0 & 0 & 0 \\ \chi^{II} a_{61}^{II} & 0 & \chi^{II} a_{63}^{II} & 0 & 0 & 0 & 0 & 0 \\ 0 & 0 & 0 & \chi^{II} a_{74}^{II} & 0 & 0 & 0 & \chi^{II} a_{78}^{II} \\ 0 & a_{82}^{II} & a_{83}^{II} & a_{84}^{II} & a_{85}^{II} & a_{86}^{II} & a_{87}^{II} & 0 \end{pmatrix}. \quad (A.4)$$

$$\chi^{II} = M^2 L_{f1} L_{f2} - L_1 L_2 L_{f1} L_{f2} + L_1 L_{f1} M_2^2 + L_2 L_{f2} M_1^2 - M_1^2 M_2^2. \quad (A.5)$$

$$a_{12}^{II} = L_2 L_{f2} M_1 + M_1 M_2^2, \ a_{13}^{II} = (-L_2 L_{f2} M_1 + M_1 M_2^2) R_1, \quad (A.6)$$

$$a_{14}^{II} = -ML_{f2} M_1 R_2, \ a_{15}^{II} = -ML_{f2} M_1,$$

$$a_{16}^{II} = -M^2 L_{f2} + L_1 L_2 L_{f2} - L_1 M_2^2 + L_2 L_{f2} M_1 - M_1 M_2^2,$$

$$a_{17}^{II} = -ML_{f2} M_1 - MM_1 M_2;$$

$$a_{32}^{II} = L_2 L_{f1} L_{f2} - L_{f1} M_2^2, \ a_{33}^{II} = (L_2 L_{f1} L_{f2} - L_{f1} M_2^2) R_1,$$

$$a_{34}^{II} = ML_{f1} L_{f2} R_2, \ a_{35}^{II} = ML_{f1} L_{f2},$$

$$a_{36}^{II} = -L_2 L_{f1} L_{f2} - L_2 L_{f2} M_1 + L_{f1} M_2^2 + M_1 M_2^2,$$

$$a_{37}^{II} = ML_{f1} L_{f2} + ML_{f1} M_2;$$

$$a_{42}^{II} = ML_{f1} L_{f2}, \ a_{43}^{II} = ML_{f1} L_{f2} R_1,$$

$$a_{44}^{II} = (L_1 L_{f1} L_{f2} - L_{f2} M_1^2) R_2,$$

$$a_{45}^{II} = L_1 L_{f1} L_{f2} - L_{f2} M_1^2, \ a_{46}^{II} = -ML_{f1} L_{f2} - ML_{f2} M_1,$$

$$a_{47}^{II} = L_1 L_{f1} L_{f2} + L_1 L_{f1} M_2 - L_{f2} M_1^2 - M_1^2 M_2;$$

$$a_{82}^{II} = -ML_{f1} M_2, \ a_{83}^{II} = -ML_{f1} M_2 R_1,$$

$$a_{84}^{II} = (-L_1 L_{f1} M_2 + M_1^2 M_2) R_2,$$

$$a_{85}^{II} = -L_1 L_{f1} M_2 + M_1^2 M_2, \ a_{86}^{II} = ML_{f1} M_2 + MM_1 M_2,$$

$$a_{87}^{II} = M^2 L_{f1} - L_1 L_2 L_{f1} - L_1 L_{f1} M_2 + L_2 M_1^2 + M_1^2 M_2;$$

$$a_{23}^{II} = \frac{1}{C_1}, \ a_{54}^{II} = \frac{1}{C_2}, \ a_{61}^{II} = -a_{63}^{II} = \frac{1}{C_{f1}},$$

$$a_{74}^{II} = -a_{78}^{II} = \frac{1}{C_{f2}}.$$

$$B_2 = \frac{1}{\chi^{II}} \begin{bmatrix} b_{11}^{II} & 0 & b_{13}^{II} & b_{14}^{II} & 0 & 0 & 0 & b_{18}^{II} \\ b_{21}^{II} & 0 & b_{23}^{II} & b_{24}^{II} & 0 & 0 & 0 & b_{28}^{II} \end{bmatrix}^T. \quad (A.7)$$

$$B_3 = \frac{1}{\chi^{II}} \begin{bmatrix} b_{11}^{II} & 0 & b_{13}^{II} & b_{14}^{II} & 0 & 0 & 0 & b_{18}^{II} \\ -b_{21}^{II} & 0 & -b_{23}^{II} & -b_{24}^{II} & 0 & 0 & 0 & -b_{28}^{II} \end{bmatrix}^T. \quad (A.8)$$

-continued $$b_{11}^{II} = M^2 L_{f2} - L_1 L_2 L_{f2} + L_1 M_2^2,$$ (A.9)

$$b_{13}^{II} = L_2 L_{f2} M_1 - M_1 M_2^2, \quad b_{14}^{II} = M L_{f2} M_1,$$

$$b_{18}^{II} = -M M_1 M_2; \quad b_{21}^{II} = M M_1 M_2,$$

$$b_{23}^{II} = -M L_{f1} M_2, \quad b_{24}^{II} = -L_1 L_{f1} M_2 + M_1^2 M_2,$$

$$b_{28}^{II} = -M^2 L_{f1} + L_1 L_2 L_{f1} - L_2 M_1^2.$$

What is claimed is:

1. A wireless power transfer system, comprising:
a send unit configured to transfer power using inductive power transfer, wherein the send unit includes:
an inverter configured to receive a DC input signal and convert the DC input signal to an AC output signal at a desired resonant frequency, wherein the inverter is further defined as a full bridge converter circuit comprised of four switches;
a send coil configured to receive the AC output signal from the inverter and generate an alternating electromagnetic field; and
a send side compensation circuit interconnecting the inverter with the send coil, wherein the compensation circuit is comprised of a send side inductor and a send side series capacitor serially coupled together at a node and to a positive terminal of the send coil, and a send side parallel capacitor coupled at the node and in parallel with the send coil;
a receive unit configured to receive power via inductive power transfer from the send coil of the send unit, wherein the receive unit includes
a receive coil configured to receive the alternating electromagnetic field from the send coil of the send unit and output an AC charging signal;
a receive side converter configured to receive the AC charging signal from the receive coil and convert the AC charging signal to a DC charging signal; and
a receive side compensation circuit interconnecting the receive coil with the receive side converter, wherein the receive side compensation circuit is comprised of a receive side inductor and a receive side series capacitor serially coupled together at a node and to a positive terminal of the receive coil, and a receive side parallel capacitor coupled at the node and in parallel with the receive coil; and
a controller electrically coupled to the four switches of the inverter and operates to turn all of the four switches on and off at a zero voltage switching condition, wherein the turn off current delivered by the controller is computed in accordance with $$I_{OFF} = \sqrt{2} \left( \frac{\frac{U_{ab}^2}{U_{AB}} \left( \frac{\Delta L_{e2}}{L_{f2}} - \frac{1}{4} \right)}{\omega_0 L_{f2}} + \frac{U_{AB}}{4\omega_0 L_{f1}} \right)$$

where $U_{AB}$ is first order root mean square value of input voltage to the inverter, $U_{ab}$ is first order root mean square value of output voltage of receive side converter, $L_{f1}$, is inductance of send side inductor, $L_{f2}$ is inductance of receive side inductor, $\omega_0$ is resonant frequency and $\Delta_{e2}$ is an increase in value of $L_{f2}$ to ensure the turn off current is positive.

2. The wireless power transfer system of claim 1 wherein the switches are further defined as power metal-oxide-semiconductor field effect transistors (MOSFETs).

3. The wireless power transfer system of claim 1 wherein an equivalent receive side inductance for the received side series capacitor and the receive side inductor has a value larger than equivalent send side inductance for the send side series capacitor and the send side inductor.

4. The wireless power transfer system of claim 1 wherein $\Delta L_2$ is computed in accordance with $$\Delta L_{e2} = \frac{1}{4} L_{f2} + \frac{I_{OFF\_min}^2 \cdot \omega_0^2 \cdot L_{f1} \cdot L_{f2}^2}{U_{ab\_min}^2}$$

where $U_{ab\_min}$ is the minimum first order root mean square value of output voltage of receive side converter and $I_{OFF\_min}$ is minimum turn off current to achieve $U_{ab\_min}$.

5. The wireless power transfer system of claim 1 wherein the receive side converter is further defined as a full wave rectifier circuit.

6. The wireless power transfer system of claim 5 further comprises a battery configured to receive the DC charging signal from the receive side converter.

7. The wireless power transfer system of claim 6 wherein the receive unit is integrated into a vehicle.

8. The wireless power transfer system of claim 1 wherein the send side inductor and the send coil share a ferrite coil and the receive side inductor and the receive coil share a ferrite coil.

9. A wireless power transfer system, comprising:
a send unit configured to transfer power using inductive power transfer, wherein the send unit includes:
a full bridge inverter circuit having four switches, the full bridge inverter circuit configured to receive the DC input signal and convert the DC input signal to an AC output signal at a desired resonant frequency;
a controller electrically coupled to each of the four switches and drives all of the switches on and off at a zero voltage switching condition;
a send coil configured to receive the AC output signal from the inverter circuit and generate an alternating electromagnetic field; and
a send side compensation circuit interconnecting the inverter circuit with the send coil, wherein the compensation circuit is comprised of a send side inductor and a send side series capacitor serially coupled together at a node and to a positive terminal of the send coil, and a send side parallel capacitor coupled at the node and in parallel with the send coil;
a receive unit configured to receive power via inductive power transfer from the send coil of the charging unit, wherein the receive unit includes
a receive coil configured to receive the alternating electromagnetic field from the send coil of the send unit and output an AC charging signal;
a receive side converter configured to receive the AC charging signal from the receive coil and convert the AC charging signal to a DC charging signal; and
a receive side compensation circuit interconnecting the receive coil with the receive side converter, wherein the receive side compensation circuit is comprised of a receive side inductor and a receive side series capacitor serially coupled together at a node and to a positive terminal of the receive coil, and a receive side parallel capacitor coupled at the node and in parallel with the receive coil;
wherein the turn off current delivered by the controller is computed in accordance with $$I_{OFF} = \sqrt{2} \left( \frac{\frac{U_{ab}^2}{U_{AB}} \left( \frac{\Delta L_{e2}}{L_{f2}} - \frac{1}{4} \right)}{\omega_0 L_{f2}} + \frac{U_{AB}}{4\omega_0 L_{f1}} \right)$$

where $U_{AB}$ is first order root mean square value of input voltage to the inverter, $U_{ab}$ is first order root mean square value of output voltage of receive side converter, $L_{f1}$ is inductance of send side inductor, $L_{f2}$ is inductance of receive side inductor, $\omega_0$ is resonant frequency and $\Delta L_{e2}$ is an increase in value of $L_{f2}$ to ensure the turn off current is positive.

10. The wireless power transfer system of claim 9 wherein an equivalent receive side inductance for the received side series capacitor and the receive side inductor has a value larger than equivalent send side inductance for the send side series capacitor and the send side inductor.

11. The wireless power transfer system of claim 9 wherein $\Delta L_{e2}$ is computed in accordance with $$\Delta L_{e2} = \frac{1}{4} L_{f2} + \frac{I_{OFF\_min}^2 \cdot \omega_0^2 \cdot L_{f1} \cdot L_{f2}^2}{U_{ab\_min}^2}$$

where $U_{ab\_min}$ is the minimum first order root mean square value of output voltage of receive side converter and $I_{OFF\_min}$ is minimum turn off current to achieve $U_{ab_{min}}$.

12. The wireless power transfer system of claim 9 wherein the receive side converter is further defined as a full wave rectifier circuit.

13. The wireless power transfer system of claim 12 further comprises a battery configured to receive the DC charging signal from the receive side converter.

14. The wireless power transfer system of claim 13 wherein the receive unit is integrated into a vehicle.

15. The wireless power transfer system of claim 9 wherein the send side inductor and the send coil share a ferrite coil and the receive side inductor and the receive coil share a ferrite coil.

* * * * *